US012784925B2

(12) United States Patent
Morrison et al.

(10) Patent No.: US 12,784,925 B2
(45) **Date of Patent: *Nov. 3, 2026**

(54) RADIATION SHIELDING FOR RADIOISOTOPE BATTERY-POWERED VEHICLE

(71) Applicant: Standard Nuclear, Inc., Oak Ridge, TN (US)

(72) Inventors: Christopher Morrison, Seattle, WA (US); Danyal Turkoglu, Seattle, WA (US)

(73) Assignee: Standard Nuclear, Inc., Oak Ridge, TN (US)

(*) Notice: Subject to any disclaimer, the term of this patent is extended or adjusted under 35 U.S.C. 154(b) by 303 days.

This patent is subject to a terminal disclaimer.

(21) Appl. No.: 18/834,071

(22) PCT Filed: Feb. 24, 2023

(86) PCT No.: PCT/US2023/013832
§ 371 (c)(1),
(2) Date: Jul. 29, 2024

(87) PCT Pub. No.: WO2024/072479
PCT Pub. Date: Apr. 4, 2024

(65) Prior Publication Data

US 2025/0140429 A1 May 1, 2025

Related U.S. Application Data

(60) Provisional application No. 63/313,471, filed on Feb. 24, 2022.

(51) Int. Cl.
*G21F 3/00* (2006.01)
*B64G 1/22* (2006.01)
(Continued)

(52) U.S. Cl.
CPC ............. *G21F 3/00* (2013.01); *B64G 1/2229* (2023.08); *B64G 1/409* (2013.01); *B64G 1/422* (2013.01);
(Continued)

(58) Field of Classification Search
CPC ......... G21F 3/00; G21F 5/015; B64G 1/2229; B64G 1/409; B64G 1/422; B64G 1/54; B61G 1/44; F03H 99/00; G21D 1/00
See application file for complete search history.

(56) References Cited

U.S. PATENT DOCUMENTS 3,121,794 A 2/1964 Held et al.
3,528,245 A 9/1970 Sitney
(Continued)

FOREIGN PATENT DOCUMENTS

WO 2023164149 A1 8/2023

OTHER PUBLICATIONS

Int'l Search Report (PCT/ISA/210) & Written Opinion (PCT/ISA/237) by the European Patent Office in Int'l App. No. PCT/US2023/013832 mailed Mar. 22, 2024. (18 pages).

*Primary Examiner* — Nicole M Ippolito
(74) *Attorney, Agent, or Firm* — Sikand IP Law PLLC

(57) ABSTRACT

Radiation shielding technologies for radioisotope battery-powered vehicles to protect computer systems and humans and increase the energy efficiency, mass efficiency, and duration capability of the vehicle during operation. A radioisotope power system includes a radioisotope power unit that emits a plurality of radiation particles. The radioisotope power system further includes a radiation shield configured to block a first radiation particle of the plurality of radiation particles. The radioisotope power system further includes a decoupling device configured to decouple the radiation shield from a vehicle. The radioisotope power unit can
(Continued)

include one or more radioisotopes for power, propulsion, or both power and propulsion of the vehicle. The one or more radioisotopes can include an alpha emitting isotope, a beta emitting isotope, a gamma emitting isotope, or a combination thereof. The one or more radioisotopes can be for heat generation. The vehicle can be a spacecraft or an aircraft.

20 Claims, 16 Drawing Sheets

(51) Int. Cl.

| | |
|---|---|
| ***B64G 1/40*** | (2006.01) |
| ***B64G 1/42*** | (2006.01) |
| ***B64G 1/44*** | (2006.01) |
| ***B64G 1/54*** | (2006.01) |
| ***F03H 99/00*** | (2009.01) |
| ***G21D 1/00*** | (2006.01) |
| ***G21F 5/015*** | (2006.01) |

(52) U.S. Cl.
CPC ................. *B64G 1/44* (2013.01); *B64G 1/54* (2013.01); *F03H 99/00* (2013.01); *G21D 1/00* (2013.01); *G21F 5/015* (2013.01)

(56) References Cited

U.S. PATENT DOCUMENTS

| | | | |
|---|---|---|---|
| 5,585,596 | A | 12/1996 | Richards et al. |
| 12,633,429 | B2 * | 5/2026 | Morrison ................ B60L 50/90 |
| 2016/0012924 | A1 | 1/2016 | McClure et al. |
| 2016/0211043 | A1 | 7/2016 | Burgett |

* cited by examiner

*FIG. 10*

Table of Radiation Shield Designs 1000 Allowing a 5 mrem/hour Dose Rate

| Co-60 Power | Shield Thickness [cm] | Full Shield Mass [kg] | Mass Per Unit Power [kg/kW$_{th}$] |
|---|---|---|---|
| 1 W | 13.2 | 350 | 350000 |
| 100 W | 15.8 | 1060 | 10600 |
| 1 kW | 16.8 | 2340 | 2340 |
| 100 kW | 19.2 | 3050 | 30 |

RADIATION SHIELDING FOR RADIOISOTOPE BATTERY-POWERED VEHICLE

CROSS-REFERENCE TO RELATED APPLICATIONS

This application is a U.S. National Phase Application of International Application No. PCT/US2023/013832, filed on Feb. 24, 2023, the entirety of which is incorporated by reference herein. International Application No. PCT/US2023/013832 claims priority to U.S. Provisional Patent Application No. 63/313,471 filed on Feb. 24, 2022, titled "Radiation Shielding for Radioisotope Battery-Powered Vehicle," the entirety of which is incorporated by reference herein.

This application relates to International Application No. PCT/US2023/013846, filed on Feb. 24, 2023, titled "Radioisotope Power System for Vehicle," the entirety of which is incorporated by reference herein.

TECHNICAL FIELD

The present subject matter relates to examples of radiation shields for attenuating radiation from a radioisotope battery implemented within a vehicle, such as a spacecraft, aircraft, etc. The present subject matter also encompasses strategically decoupling (e.g., ejecting or removing) a radiation shield from a vehicle to improve efficiency.

BACKGROUND

Conventional nuclear reactor systems utilize radiation shielding to deflect or absorb emitted radiation, to protect people as well as equipment. However, when building a nuclear reactor system for terrestrial land applications, e.g., a nuclear power plant, the size (e.g., space or volume) and mass of the nuclear reactor are not major concerns. Typically, the actual thickness of the radiation shielding used is much greater than the required thickness needed to appropriately reduce fast neutron fluence to safe levels beyond the nuclear reactor. Therefore, the conventional nuclear reactor tends to have a very thick neutron reflector in order to reduce neutron fluence external to the nuclear reactor.

But size and mass are very important factors that impact the performance and efficiency of a vehicle, such as a spacecraft traveling to outer space, or an aircraft. For example, if the vehicle carries a nuclear reactor system (e.g., a fission nuclear reactor) for propulsion of the vehicle or to provide nuclear power (e.g., thermal and/or electrical power) in outer space, the size and mass are very important considerations. The mass of the nuclear reactor system being carried by the vehicle will directly affect performance, such as power per mass, in both the nuclear propulsion and power applications. The size of the nuclear reactor system may also add drag on the vehicle and increase manufacturing cost.

High-power density radioisotope batteries can be an ideal candidate to provide the energy required for the vehicle, such as a spacecraft, aircraft, etc. However, radioisotope batteries have challenges associated with their use. In particular, the x-rays and gamma rays emitted by certain radioisotopes can damage computer systems as well as harm humans. Additionally, radioisotope batteries still add significant size and mass to the vehicle even albeit somewhat less than the nuclear reactor system would.

SUMMARY

Hence, there is room for further improvement in the radiation shielding of radioisotope battery-powered vehicles.

The radioisotope power system 100 and radiation shielding 105 technologies disclosed herein increase the energy efficiency, mass efficiency, and duration capability of a vehicle 101 during operation, such as in outer space 701. Advantageously, the radioisotope power system 100 technologies can enable a vehicle 101 to move faster for longer. To implement the radiation shielding technologies, a spacecraft 102 can include a radiation shield 105 (e.g., ejectable shield 105) to block radiation from the radioisotope battery 220, and yet can after ejecting the radiation shield 105, move fast enough for long enough to, for example, catch an extrasolar object being launched by the sun's gravitational force.

The radiation shield 105 disclosed herein can increase the mass efficiency of the vehicle 101, while still protecting computer systems and humans (e.g., ground personnel 899). For example, the radiation shield 105 blocks radiation during preparation and powered ascent of a spacecraft 102 out of the Earth's atmosphere. Upon ejection of the radiation shield 105, the overall mass of the spacecraft 102 is substantially reduced, thereby improving the thrust to mass ratio of the spacecraft 102 (or another vehicle 101) and payload 135 efficiency. For example, the radiation shield 105 may constitute seventy-five percent of the mass of the spacecraft 102 before ejection, thereby tripling the thrust to mass ratio of the spacecraft 102 after ejection of the radiation shield 105.

In a first example, a radioisotope power system 100 includes a radioisotope power unit 120 that emits a plurality of radiation particles 892A-B. The radioisotope power system 100 further includes a radiation shield 105 configured to block a first radiation particle 892A of the plurality of radiation particles 892A-B. The radioisotope power system 100 further includes a decoupling device 110 configured to decouple the radiation shield 105 from a vehicle 101. The radioisotope power unit 120 can include one or more radioisotopes for power, propulsion, or both power and propulsion of the vehicle 101. The one or more radioisotopes can include an alpha emitting isotope, a beta emitting isotope, a gamma emitting isotope, or a combination thereof. The one or more radioisotopes can be for heat generation.

In a second example, a vehicle 101, such as a spacecraft 102, or an aircraft, includes a radioisotope power system 100. The radioisotope power system 100 includes a radioisotope power unit 120 that emits a plurality of radiation particles 892A-B. The radioisotope power system 100 further includes a radiation shield 105 configured to block a first radiation particle 892A of the plurality of radiation particles 892A-B. The radioisotope power system 100 further includes a decoupling device 110 configured to decouple the radiation shield 105 from the vehicle 101. The vehicle 101 further includes electronics 130 configured to control the vehicle 101.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 10 is a table of radiation shield designs allowing a 5 mrem/hour dose rate depicting the shield thickness and shield mass of the radiation shield required to properly shield from a radioisotope generating the identified amount of power.

Figure 1B:
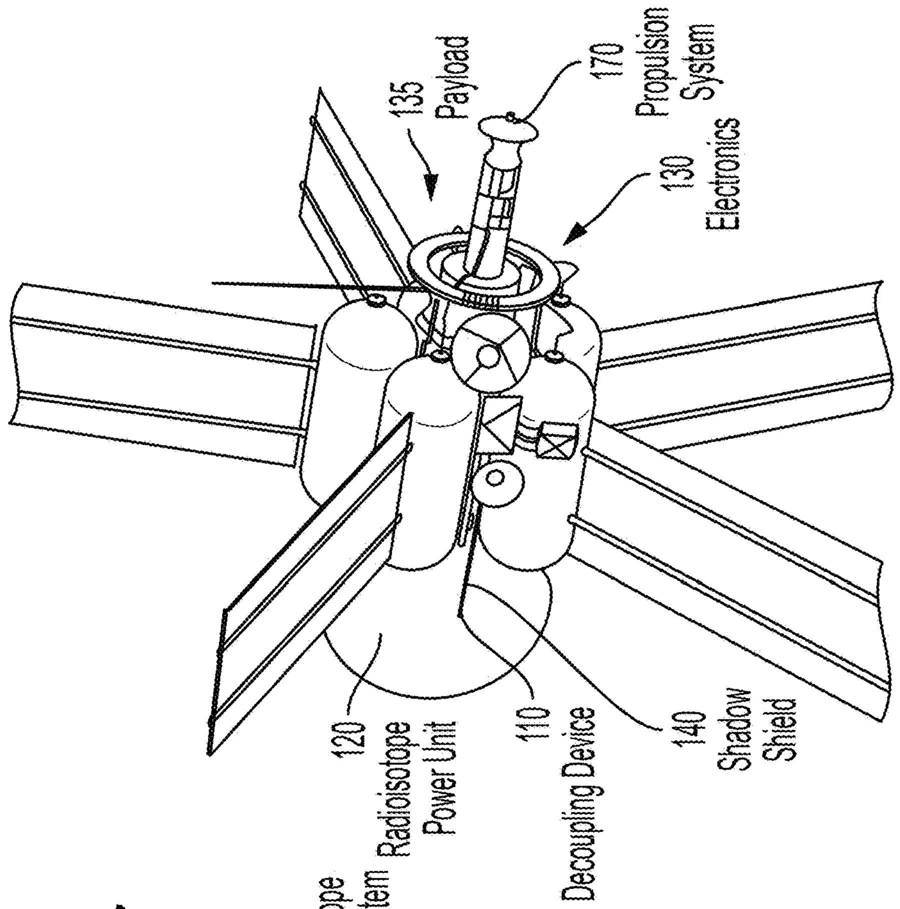
FIG. 1B is a back-perspective view of the spacecraft that depicts the radioisotope power system, the plurality of propellant tanks, the plurality of radiator fins, and other components.

| Parts Listing | |
|---|---|
| 100 | Radioisotope Power System |
| 101 | Vehicle |
| 102 | Spacecraft (e.g., Extrasolar Object Interceptor) |
| 105 | Radiation Shield (e.g., Ejectable Shield) |
| 106 | Remainder of Spacecraft |
| 110 | Decoupling Device |
| 120 | Radioisotope Power Unit |
| 125 | Aeroshell |
| 130 | Electronics |
| 135 | Payload |
| 140 | Shadow Shield |
| 160A-J | Propellant Tanks |
| 165A-E | Radiator Fins |
| 170 | Propulsion System |
| 215 | Thermal Interface |
| 220 | Radioisotope Battery (e.g., Nuclear Battery or Chargeable Atomic Battery (CAB)) |
| 225 | Safety Impact Liner |
| 230 | Heat Pipe |
| 250 | Extendable Boom |
| 302 | Balance of Spacecraft |
| 310 | Launchcraft Adapter Plate |
| 315 | Thermoelectric Module Housing |
| 330 | Thermoelectric Generator |
| 335 | Sensitive Volume |
| 450A | Unextended Boom State |
| 450B | Extended Boom State |
| 570A-N | Field-Emission Electric Propulsion (FEEP) Thrusters |
| 701 | Outer Space |
| 702 | Astronomical Body |
| 705A-B | Sub-Shields |
| 802 | Nuclear Chargeable Ceramic |
| 805, 805A-D | Shield Thickness |
| 850 | Shadow Shield Protected Arc |
| 851 | Radiation Shield Protected Arc |
| 859 | Precursor Material |
| 892A-B | Radiation Particles |
| 899 | Ground Personnel (e.g., Humans, People) |
| 900 | Scatterplot Graph of Power per Unit Mass versus Energy per Unit Mass |
| 901 | Power per Unit Mass |
| 905A-L | Radioisotope Energy Sources |
| 905M | Chemical Batteries |
| 905N | Combustion Fuel |
| 905O | Fuel Cells |
| 1000 | Table of Radiation Shield Designs |
| 1002A-D | Shield Design |
| 1010, 1010A-D | Power Level |
| 1020, 1020A-D | Shield Mass |
| 1030, 1030A-D | Mass Per Unit Power |
| 1100 | Radioisotope Battery Encapsulation Chart |
| 1101 | Type 1: (Wall) Encapsulation |
| 1102 | Type 2: (Wall and Matrix) Encapsulation |
| 1103 | Type 3: (Wall, Matrix, and Coating) Encapsulation |
| 1105 | Type 0: No Encapsulation |
| 1111A-N | Encapsulation Walls |

-continued

| Parts Listing | |
|---|---|
| 1112 | Filling |
| 1150 | Encapsulation Matrix |
| 1151A-N | Precursor Material Particles |
| 1152 | Encapsulation Material |
| 1153A-N | Precursor Kernels |
| 1154-1157 | Precursor Encapsulation Coatings |
| 1200 | Radioisotope Battery Production Lifecycle |

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical or physical connection. Unless described otherwise, coupled elements or devices are not necessarily directly connected to one another and may be separated by intermediate components, elements, etc.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The terms "approximately," "significantly," or "substantially" means that the parameter value or the like varies up to ±25% from the stated amount.

The orientations of the radioisotope power system 100, vehicle 101 (e.g., spacecraft 102 or aircraft), propellant tanks 160A-J, radiator fins 165A-E, propulsion system 170, associated components, and/or any complete devices incorporating the radioisotope power system 100 or vehicle 101, such as shown in any of the drawings, are given by way of example only, for illustration and discussion purposes. In operation, the radioisotope power system 100 and the vehicle 101 may be oriented in any other direction suitable to the particular application, for example upright, sideways, or any other orientation. Also, to the extent used herein, any directional term, such as lateral, longitudinal, up, down, upper, lower, top, bottom, front, rear, side, left, and right are used by way of example only, and are not limiting as to direction or orientation of any radioisotope power system 100 or vehicle 101 or component of the radioisotope power system 100 or the vehicle 101 constructed as otherwise described herein.

The various examples disclosed herein relate to a radioisotope power system 100 and a vehicle 101, such as a spacecraft 102 or aircraft, that includes the radioisotope power system 100. By utilizing the radioisotope power unit 120, the vehicle 101 can achieve significant mass savings compared to a conventional spacecraft that uses chemical batteries and fossil fuels for propulsion, for example. The vehicle 101 can include a propulsion system 170 that includes field-emission electric propulsion (FEEP) thrusters 570A-N, which allows for implementation of liquid metal propellant. The liquid metal propellant improves volumetrics of the vehicle 101 as well as removes pressurization requirements for propellant tanks 160A-E. Conventional fuels and propellants are too slow, too heavy, and too quick to burn up.

Additionally, the examples disclosed herein relate to radiation shielding of the radioisotope power system 100 and the vehicle 101 via a radiation shield (e.g., ejectable shield) 105 and shadow shield 140. The radiation shield 105 can be designed to protect people (e.g., ground personnel 899), but once the spacecraft 102 powered by the radioisotope battery 220 is in space, the radiation shield 105 is decoupled (e.g., ejected) from the spacecraft 102. Decoupling of the radiation shield 105 from the spacecraft 102 can result in a mass reduction of approximately 75%. In one example, utilizing the technologies described herein can enable a spacecraft 102 to catch up to and capture extrasolar objects being slingshot by the sun.

Reference now is made in detail to the examples illustrated in the accompanying drawings and discussed below.

Figure 1A:
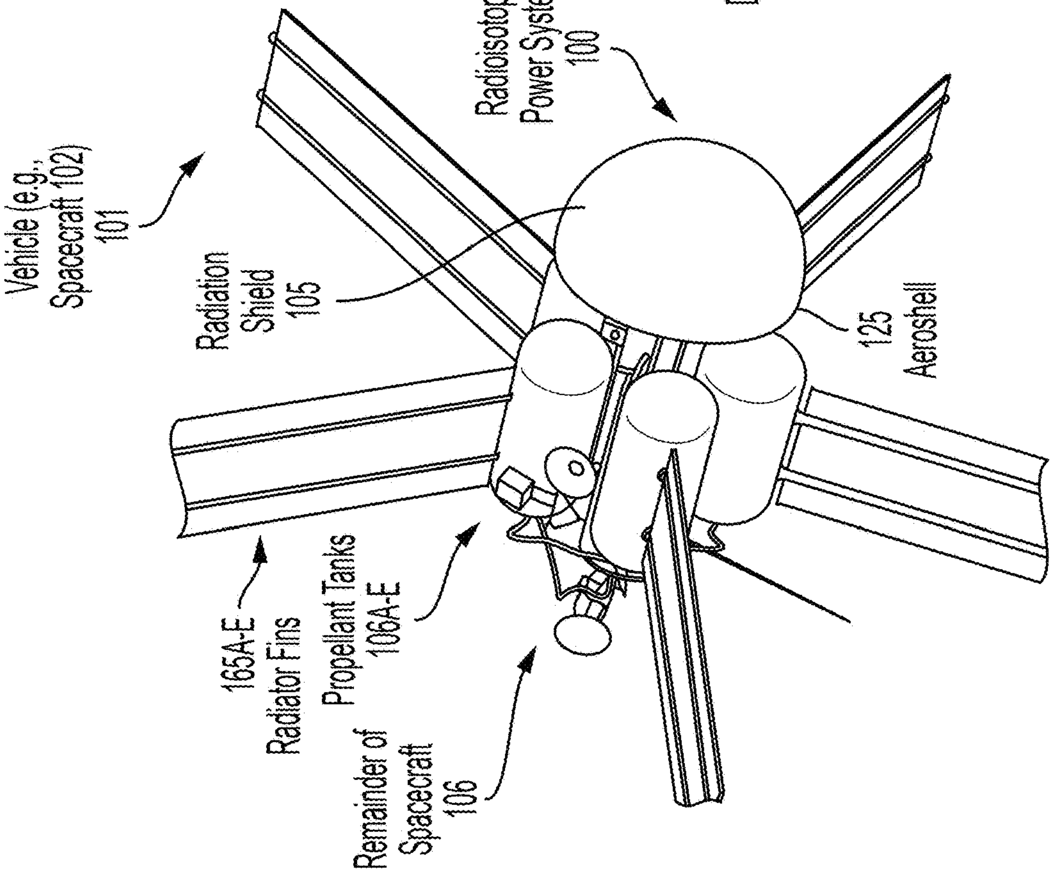
FIG. 1A is front-perspective view of a vehicle (e.g., spacecraft) that includes a radioisotope power system, a plurality of propellant tanks, a plurality of radiator fins, and other components.
Figure 1C:
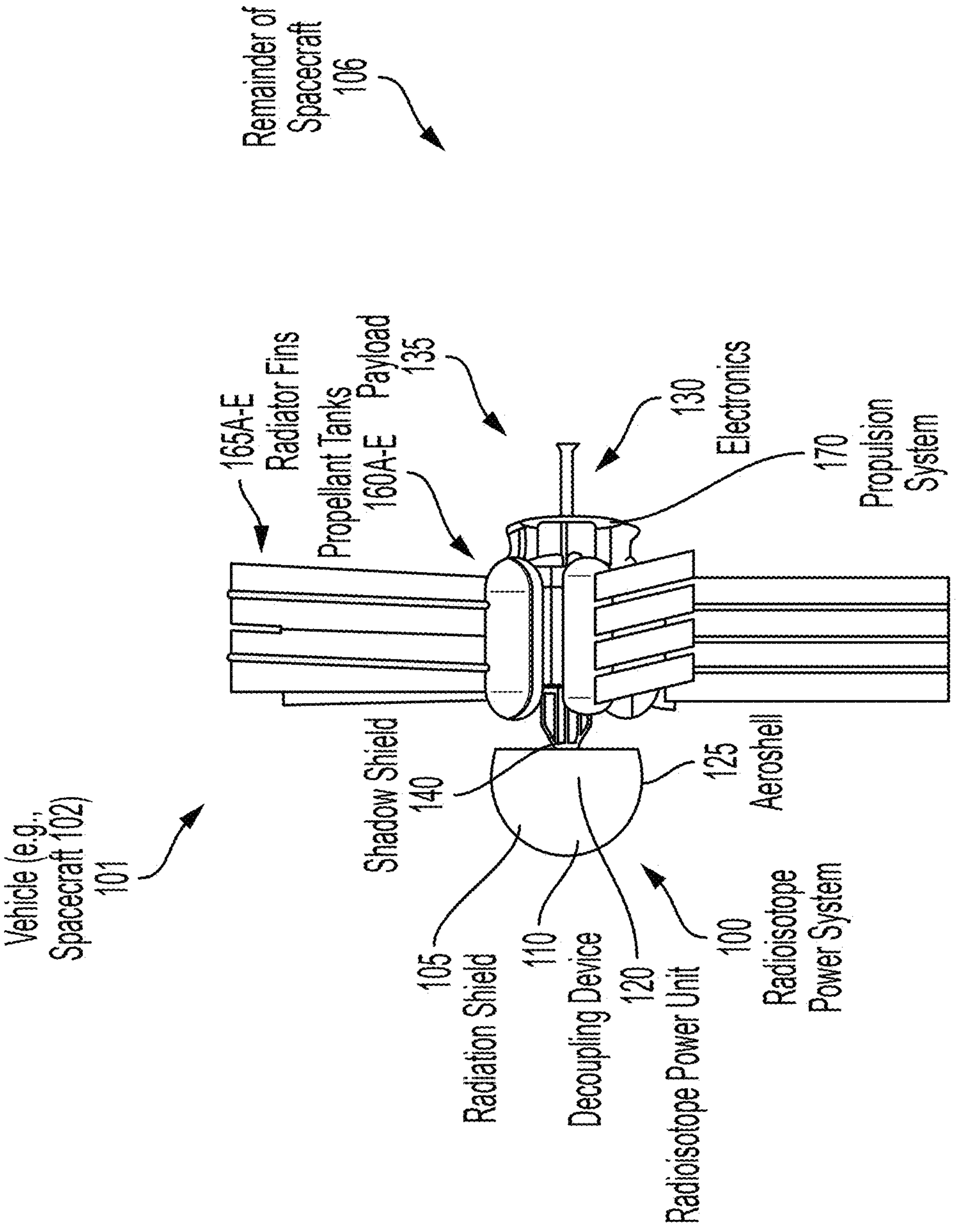
FIG. 1C is a side-perspective view of the spacecraft that depicts the radioisotope power system, the plurality of propellant tanks, the plurality of radiator fins, and other components.

FIG. 1A is front-perspective view of a vehicle 101 (e.g., spacecraft 102) that includes a radioisotope power system 100, a plurality of propellant tanks 160A-E, a plurality of radiator fins 165A-E, and other components. FIG. 1B is a back-perspective view of the spacecraft 102 that depicts the radioisotope power system 100, the plurality of propellant tanks 160A-E, the plurality of radiator fins 165A-E, and other components. FIG. 1C is a side-perspective view of the spacecraft 102 that depicts the radioisotope power system 100, the plurality of propellant tanks 160A-E, the plurality of radiator fins 165-E, and other components.

Vehicle 101 can be a spacecraft 102, an aircraft, or a combination thereof. In the example of FIGS. 1A-C, the vehicle 101 is a spacecraft 102 (e.g., an extrasolar object interceptor). However, the vehicle 101 can be an aircraft. The vehicle 101 may function both as a spacecraft 102 and an aircraft, for example, depending upon the presence or absence of an atmosphere. Vehicle 101 can also include electronics 130 (see FIG. 8) configured to control the vehicle 101, an optional aeroshell 125, as well as a payload 135 and propulsion system 170. In example of FIGS. 1A-C, the vehicle 101 includes five propellant tanks 160A-E and five radiator fins 165A-E.

Radioisotope power system 100 includes a radioisotope power unit 120 (see FIG. 3B) that emits a plurality of radiation particles 892A-B to generate heat. The radioisotope power system 100 further includes a radiation shield 105 (see FIG. 3B) configured to block a first radiation particle 892A of the plurality of radiation particles 892A-B (see FIG. 8). The radioisotope power system 100 further includes a decoupling device 110 configured to decouple the radiation shield 105 from the vehicle 101. The decoupling device 110 may be further configured to decouple the aeroshell 125. The radioisotope power unit 120 can include one or more radioisotopes for power, propulsion, or both power and propulsion of the vehicle 101. The one or more radioisotopes can include an alpha emitting isotope, a beta emitting isotope, a gamma emitting isotope, or a combination thereof. The one or more radioisotopes can be for heat generation.

Figure 2:
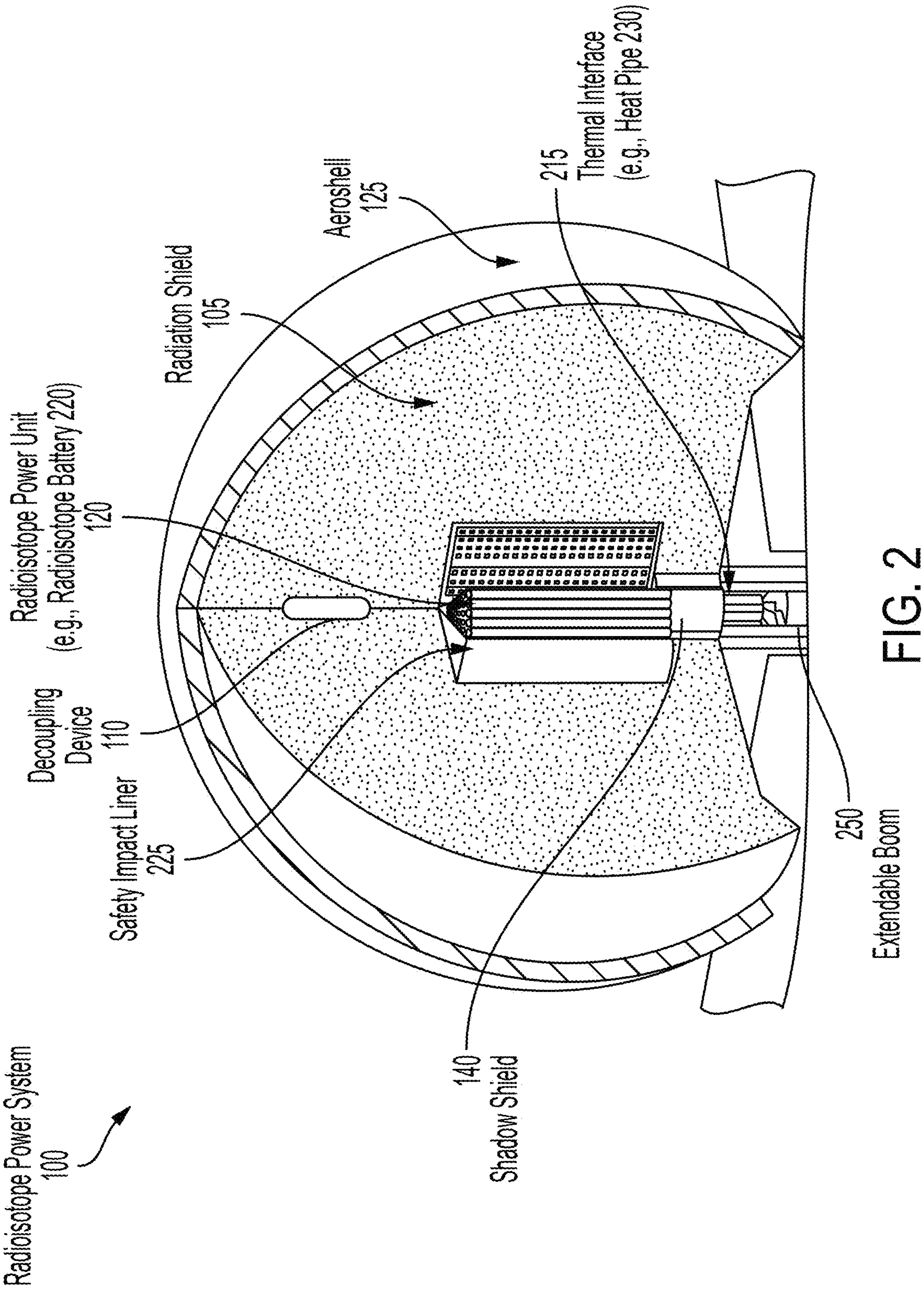
FIG. 2 is a cutaway view of a radioisotope power system of FIGS. 1A-C depicting details of the radioisotope power system, particularly a radioisotope power unit, radiation shield and decoupling device, as well as other components of the spacecraft.
Figure 3A:
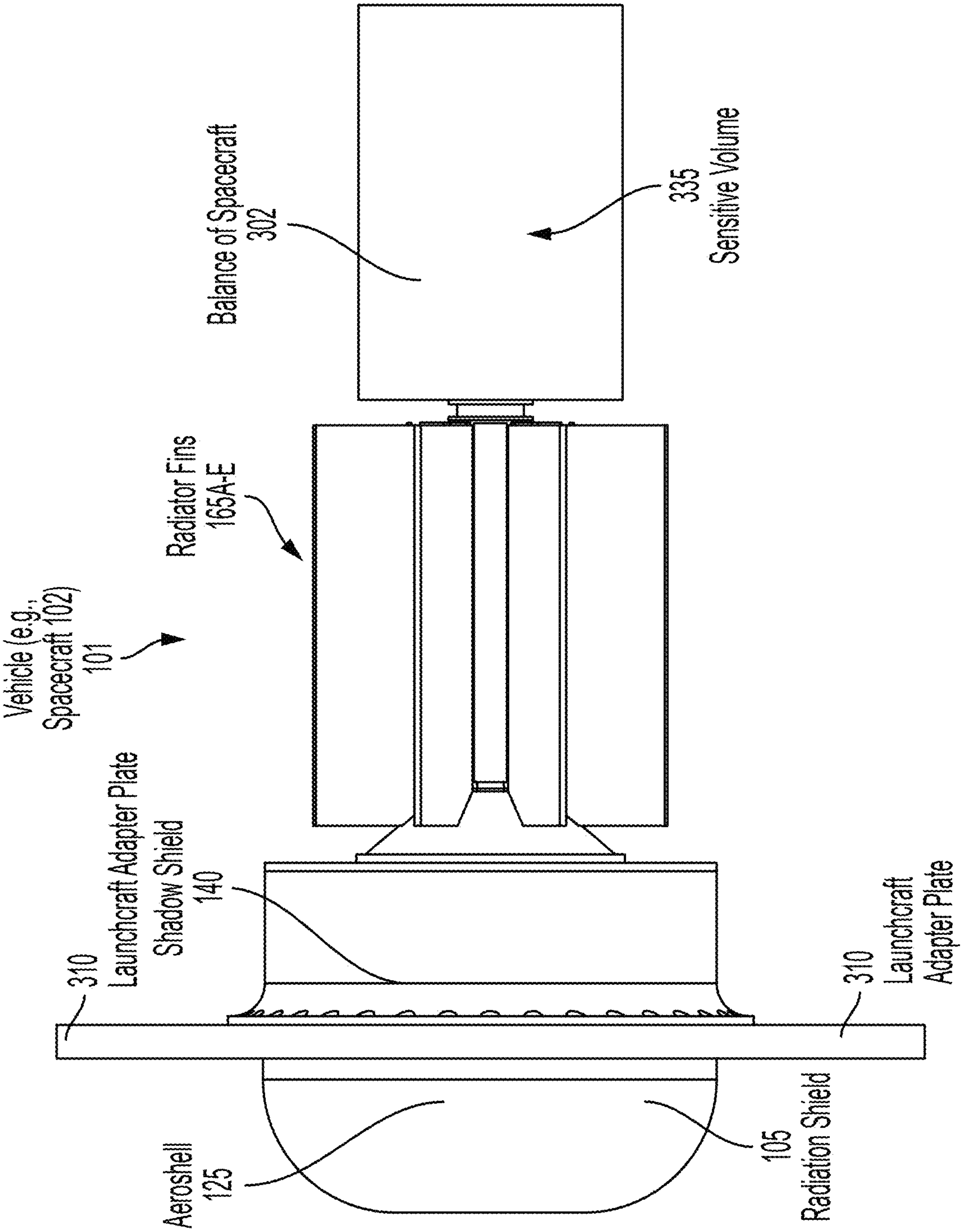
FIG. 3A is a side view of the spacecraft of FIGS. 1A-C with the radiation shield coupled to the balance of the spacecraft.
Figure 3B:
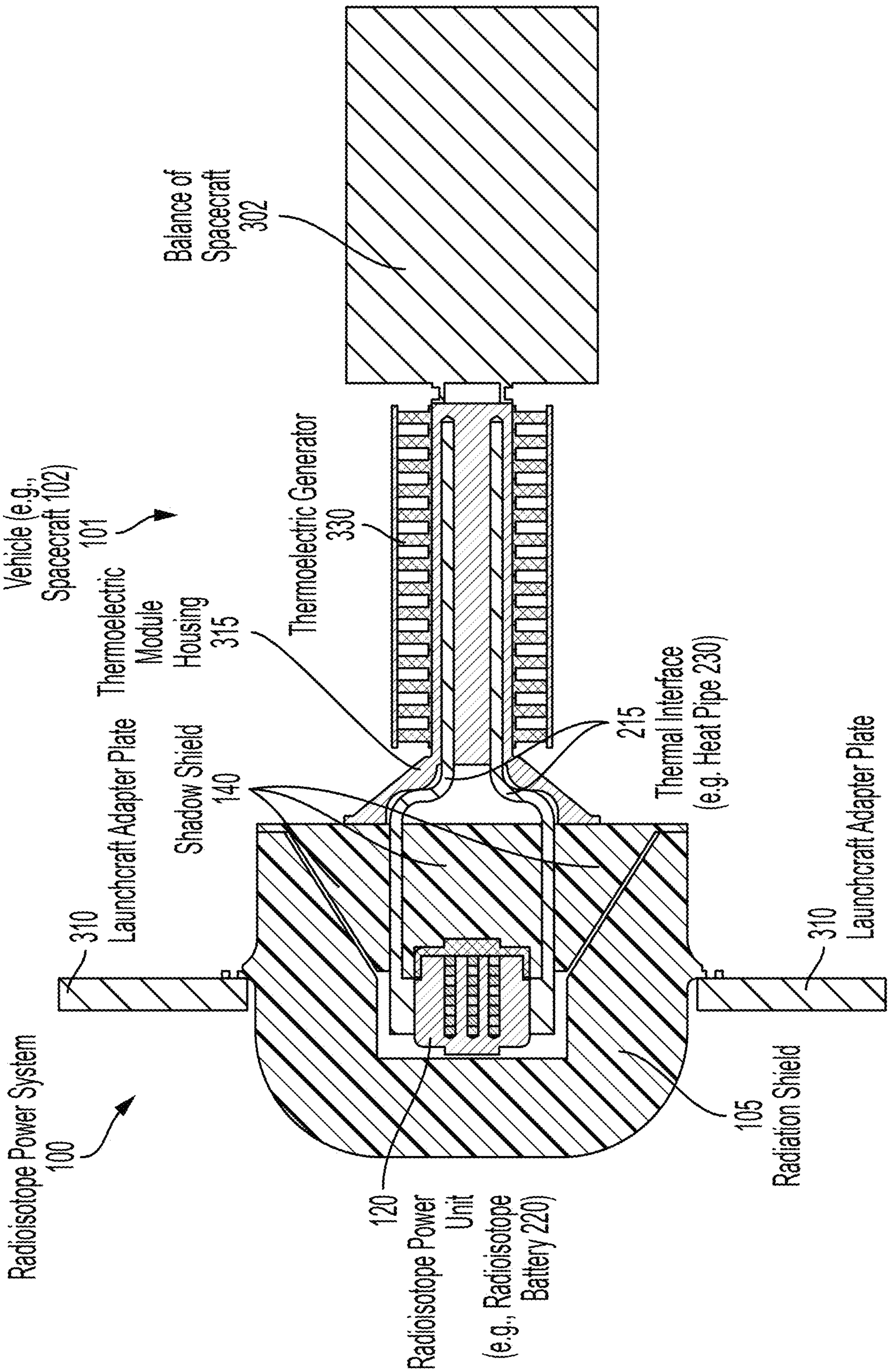
FIG. 3B is a cross-sectional view of the spacecraft like that of FIG. 3A, but depicting details of the radioisotope power unit, radiation shield, shadow shield, and thermoelectric generator.

Radioisotope power unit 120 can be a radioisotope battery 220 (see FIGS. 2 and 3B). The radioisotope battery 220 (see FIG. 2) can be a nuclear battery, chargeable atomic battery (CAB), traditional atomic battery, etc., and can be formed of radioisotopes to generate heat, such as a nuclear chargeable ceramic. Radioisotope battery 220 can include, for example, Cobalt, Europium, Neptunium, Plutonium, or Thulium. A description of a radioisotope battery 220, such as a CAB, is provided in the following publications of Ultra Safe Nuclear Corporation of Seattle, Washington: U.S. Patent Pub. No. 2023/0023052, published Jan. 26, 2023, titled "Fully Ceramic Encapsulated Radioactive Heat Source"; U.S. Patent Pub. No. 2023/0051201, published Feb. 16, 2023, titled "Chargeable Atomic Battery and Activation Charging Production Methods"; and International Patent Pub. No. WO 2021/159041, published Aug. 12, 2021, titled "Chargeable Atomic Battery with Pre-Activation Encapsulation Manufacturing."

In this example, the radioisotope power system 100 includes a radioisotope power unit 120 that can include a radioisotope battery 220 (e.g., Cobalt-60 thermal power source). However, the radioisotope battery 220 can include a variety of other radioisotopes besides Cobalt-60, such as Plutonium-238 (and fission products), Europium-152, Thulium-170, etc. Radioisotope power system 100 further includes a thermal interface 215 (e.g., heat pipe 230) and a high-efficiency thermoelectric generator 330 (see FIGS. 2 and 3B) to supply power to an electric propulsion system 170. Radioisotope battery 220 emits a plurality of radiation particles 892A-B (see FIG. 8) as a consequence of the radioactive decay of the radioisotopes. The radioactive decay produces decay heat, which releases heat as the energy of the radiation is converted into thermal movement of atoms.

The example spacecraft 102 of FIGS. 1A-C can leverage the high specific impulse of electric propulsion without dependence on the sun, as would a purely-solar powered extrasolar object interceptor. The overall power balance from the radioisotope power unit 120 is radiated as thermal power and converted to electrical power by a thermoelectric generator 330 (FIG. 3B), such as solid-state converters, and finally distributed to all electronics 130 of the spacecraft 102. In particular, voltages from solid-state converters are routed to a power management and distribution (PMAD) device which steps up the DC voltage for the field-emission electric propulsion (FEEP) thrusters 570A-N (see FIGS. 5A-B) of an electric propulsion system 170. Spacecraft 102 can also include solar sails in concert with the radioisotope battery 220 (see FIG. 2) to enhance performance.

Radiation shield 105 can comprise depleted uranium, natural uranium, lead, tungsten alloy, or a combination thereof. The radiation shield 105 can also include a non-trace quantity of an element identified in a periodic table as a sixth period or greater element—meaning, elements with an atomic number, or number of protons, greater than or equal to fifty-five. If the radioisotopes in the radioisotope battery 220 include Thulium-170, then the radiation shield 105 can primarily block x-ray emissions (the x-rays are generated by beta particles slowing down.) If the radioisotopes in the radioisotope battery 220 include Plutonium-238 (and fission products), Cobalt-60, Europium-152, etc., then the radiation shield 105 can primarily block gamma radiation (high-energy photons emitted by a nucleus).

The radiation shield 105 is designed to protect humans (e.g., ground personnel 899) from the radiation particles 892A-B (see FIG. 8) after integration of the vehicle 101 with the radioisotope power unit 120. In the spacecraft 102 example, integration can be before the interstellar portion of a mission. The radiation shield 105 can be made from depleted Uranium, and can be designed to permit, at most, a 5 rem/hour of dose at 30 cm to ground personnel 899 (see FIG. 8). The thickness or density of the radiation shield 105 can be adjusted to ensure the radiation dose rate is below the U.S. Nuclear Regulatory Commission (NRC) definition of a radiation area and to be similar to the dose on the International Space Station (ISS). The radiation shield 105 renders the radioisotope power unit 120 safe for ground crews of ground personnel 899 to operate in proximity to the spacecraft 102 for extended periods of time (e.g., tens of hours).

Two components of the radioisotope power system 100 obviate the mass of radiation shield 105 and the need for the radiation shield 105 once the spacecraft 102 is in outer space 701 (see FIGS. 7A-B): (1) the decoupling device 110; and (2) the shadow shield 140. Decoupling device 110 is configured to remove the mass of the radiation shield 105 from a remainder of the spacecraft 106 (see FIGS. 4A-B and 7A-B). The remainder of the spacecraft 106 is the spacecraft 102 minus the radiation shield 105 and any portion of the decoupling device 110 not remaining with the spacecraft 102 (see FIGS. 3D, 4A, 7B). The decoupling device 110 can include pyrotechnic or mechanical fasteners or actuators, or frangible nut and tension stud devices to eject the radiation shield 105 from the spacecraft 102. The decoupling device 110 may split the radiation shield 105 into two or more sub-shields 705A-B (see FIG. 7B), in order to more efficiently propel the sub-shields 705A-B clear, away from the remainder of the spacecraft 106. The decoupling device 110 may also include heating elements to melt some or all of the radiation shield 105, in order to decouple the radiation shield 105 from the remainder of the spacecraft 106, so that the radiation shield 105 is no longer in a deployed state. The shadow shield 140 remains deployed with the spacecraft 102 to provide shielding to the components, such as electronics 130, which are sensitive to radiation, in outer space 701 (see FIGS. 7A-B).

Remainder of the spacecraft 106 can decouple from or eject the radiation shield 105, or the radiation shield 105 can decouple from or eject the remainder of the spacecraft 106. In a low-friction, floating environment such as space, after an ejection or decoupling, both the radiation shield 105 and the remainder of the spacecraft 106 can immediately proceed on opposite velocity vectors. Those opposite velocity vectors can be inversely proportional to the size of the radiation shield 105 and the remainder of the spacecraft 106, respectively. The radiation shield 105 is ejected from the remainder of the spacecraft 106, but the remainder of the spacecraft 106 is also ejected from the radiation shield 105. Both trajectories are accounted for in planning a mission and determining whether the remainder of the spacecraft 106 is clear from the radiation shield 105. Under another definition, an "ejector" may be the component (either the radiation shield 105 or remainder of spacecraft 106) which retains a larger proportion of the decoupling device 110. For example, when the decoupling device 110 includes a frangible nut, the component which retains the bolt may be considered the "ejector" component, while the component secured to the bolt by the frangible nut may be considered the "ejectee" component. Regardless, the decoupling device 110 can have a larger proportion remain with the radiation shield 105 or a larger portion remain with the remainder of the spacecraft 106 after decoupling. The language of decoupling or ejecting should not imply a required directionality between the radiation shield 105 and the remainder of the spacecraft 106, based upon mass, acceleration, or remaining proportions of the decoupling device 110 after decoupling.

Figure 5A:
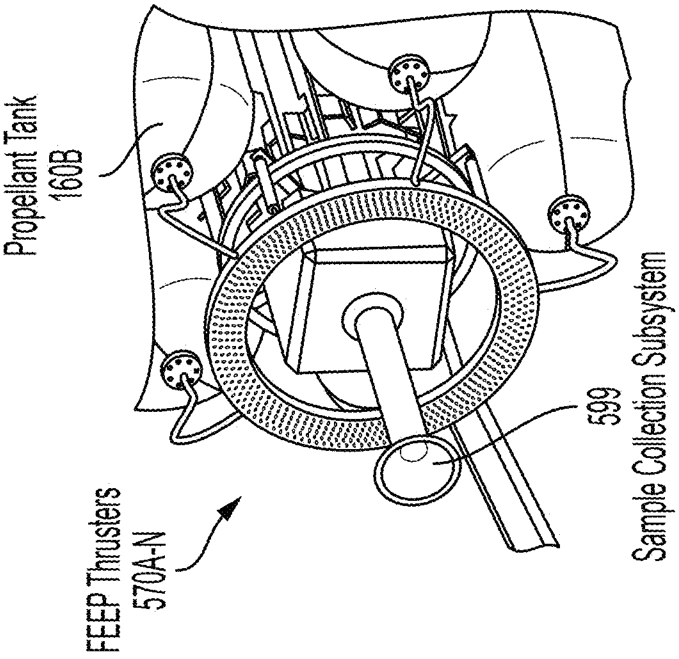
FIG. 5A is an isometric view of the bottom of the propulsion system of the spacecraft of FIGS. 1A-C and depicting a plurality of field-emission electric propulsion (FEEP) thrusters.

Payload 135 can be any number of components or materials intended for use during the mission—in particular, including components or materials not directly related to facilitating space travel, such as those related to a sample collection subsystem 599 (see FIG. 5A). The payload 135 may receive heat or electricity directly or indirectly from the radioisotope power unit 120. The payload 135 may vary in size and mass over the duration of the mission, in particular, if the mission includes deploying or retrieving some object.

Propulsion system 170 can be an electric propulsion system, which includes a type of ion thruster, such as FEEP thrusters 570A-N (see FIGS. 5A-B), that operate on the principle of field ionization of a liquid metal. For example, the propulsion system 170 pumps a liquid metal propellant, such as indium, through an ionizing accelerator. The accelerator of the propulsion system 170 includes an electrode capable of generating a strong electric field to accelerate and ionize the liquid metal propellant, creating a propulsive ion jet for thrust or power generation. Metal propellant can be electrically heated to change from a solid state to a liquid state. However, to improve the overall power efficiency of the electric propulsion system 170, the propellant can be heated using waste heat from the thermoelectric generator 330 (see FIG. 3B) before ionizing the propellant. Vehicle 101 can include any other type of conventional propulsion system 170 which can be powered by the radioisotope power unit 120, and any other type of conventional propellant which can be expelled or expanded to create thrust or motive force by the propulsion system 170.

FIG. 2 is a cutaway view of a radioisotope power system 100 of FIGS. 1A-C depicting details of the radioisotope power system 100, particularly a radioisotope power unit 120, radiation shield 105 and decoupling device 110, as well as other components of the spacecraft 102. Other depicted components include extendable boom 250 (see also FIGS. 4A-B), aeroshell 125, and shadow shield 140.

In FIG. 2, decoupling device 110 is depicted as embedded within the radiation shield 105. For example, the decoupling device 110 can include a pyrotechnic designed to combust and split the radiation shield 105 into two sub-shields 705A-B. As further radioisotope power system 100 includes a safety impact liner 225, which can be an encapsulation layer around the entire radioisotope battery 220 that is resilient to impact, in particular during an accident, for example, during launch. Further, the safety impact liner 225 is refractory, for example, heat resistant and difficult to melt.

Radioisotope power system 100 includes a thermal interface 215 which can include a conductive interface, a heat pipe 230 (e.g., lithium-based), or a combination thereof. Thermal interface 215 directs heat produced by the radioisotope power unit 120 to a thermoelectric generator 330 in order to provide heat to the thermoelectric generator 330 so that the thermoelectric generator 330 generates heat-based power (see FIG. 3B). In the example, the thermal interface 215 includes a heat pipe 230 that is coupled to the radioisotope battery 220 and circulates coolant, propellant, or a combination thereof, in order to heat the propellant for thrust.

Figure 8:
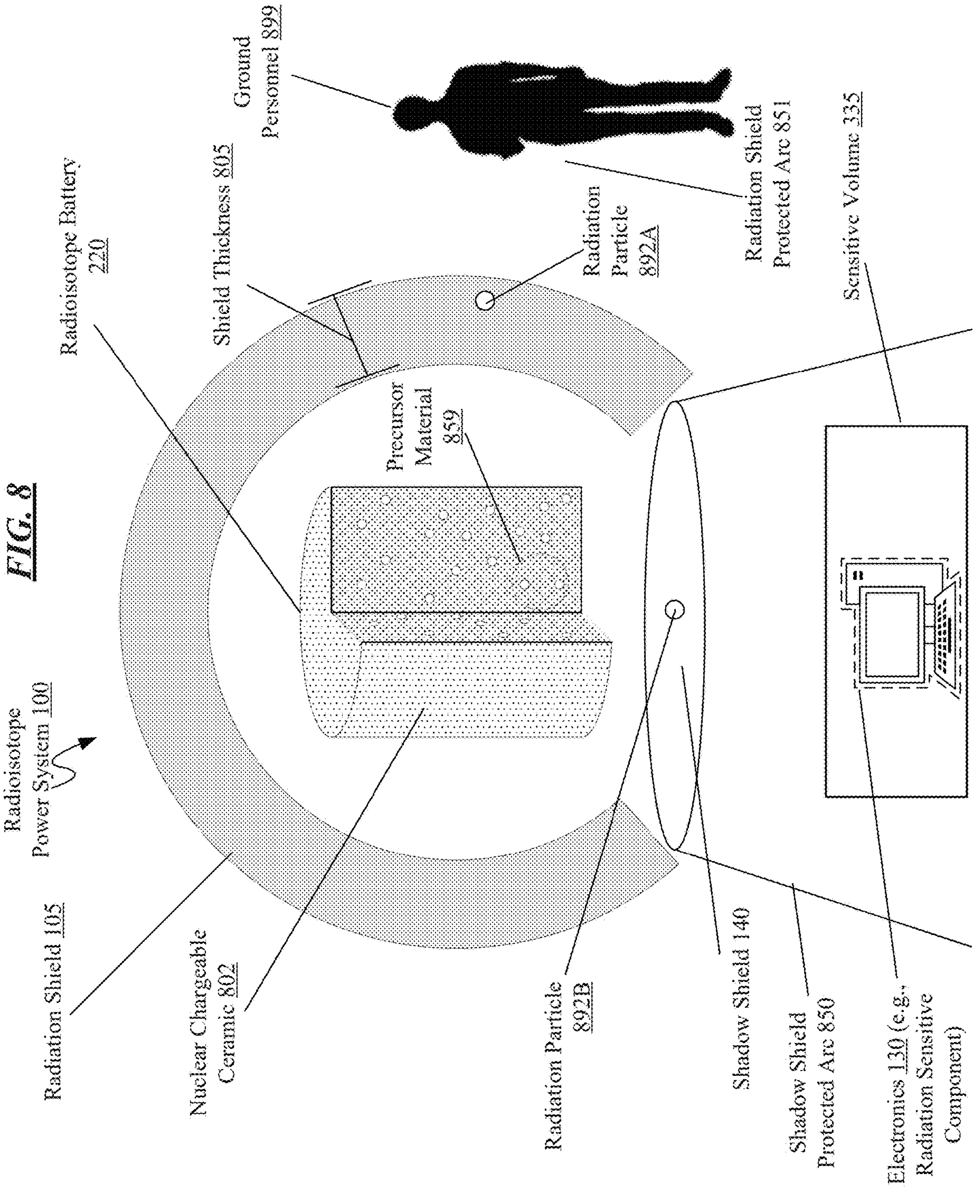
FIG. 8 depicts the radioisotope power system of FIG. 2 showing a notional cutaway view of the radiation shield and the shadow shield enclosing the radioisotope power unit, and further depicting a plurality of radiation particles and paths emitted by the radioisotope power unit.

Radioisotope power system 100 can further include shadow shield 140, which is configured to block a second radiation particle 892B of the plurality of radiation particles 892A-B (see FIG. 8). The decoupling device 110 is configured to maintain coupling of the shadow shield 140 to the electronics 130 during a mission (see FIG. 8), and does not disconnect, eject, or decouple the shadow shield 140. The electronics 130 can be configured to control the vehicle 101, including the propulsion system 170, the payload 135, the sample collection subsystem 599 (see FIG. 5A), the thermoelectric generator 330 (see FIG. 3B), the extendable boom 250, the decoupling device 110, the radioisotope power unit 120, other electrically, mechanically, or thermally-controlled components, or a combination thereof. The maintained coupling of the shadow shield 140 to the electronics 130 during the mission can be configured to prevent some or all of the radiation particles 892A-B from reaching the electronics 130. The radiation shield 105 can be configured to block the first radiation particle 892A that travels around or is not blocked by the shadow shield 140. The shadow shield 140 can be configured to block the second radiation particle 892B that is on a trajectory to intersect with electronics 130, payload 135, power modulation such as the thermoelectric generator 330 (see FIG. 3B), other sensitive components, or a combination thereof.

FIG. 3A is a side view of the spacecraft 102 of FIGS. 1A-C with the radiation shield 105 coupled to a balance of the spacecraft 302. The balance of spacecraft 302 includes all of the components of the spacecraft 102 not explicitly depicted in FIGS. 3A-C. Balance of spacecraft 302 includes, in part, the electronics 130, the payload 135, a sample collection subsystem 599 (see FIG. 5), and the propulsion system 170, which may include FEEP thrusters 570A-N (see FIGS. 5A-B).

As shown in FIG. 3A, in spaceflight deployments, the spacecraft 102 can include aeroshell 125 to protect the spacecraft 102 during atmospheric exit. In some cases, the aeroshell 125 can further keep the radioisotope power unit 120 from being released during an accident, e.g., as upon accidental atmospheric reentry during an event, such as a rocket launch failure. Such an aeroshell 125 can include the radiation shield 105 to protect any equipment or ground personnel 899 from radiation emitted by the radioisotope battery 220. In other examples, the radiation shield 105 may not be as purpose-built as an integrated radiation shielding aeroshell 125. Radiation shield 105 can be formed as a cladding that encases the radioisotope power unit 120, particularly if the radioisotope battery 220 emits x-rays. In some cases, the aeroshell 125 can serve as additional radiation shielding to reduce the size of the main radiation shield 105.

FIG. 3B is a cross-sectional view of the spacecraft 102 like that of FIG. 3A, but depicting details of the radioisotope power unit 120, radiation shield 105, shadow shield 140, and thermoelectric generator 330. As shown in FIG. 3B, the radioisotope power system 100 includes the shadow shield 140 to provide mass effective spot shielding to components of the spacecraft 102. Shadow shield 140 can be made of the same material as the radiation shield 105, or another shielding material. The shadow shield 140 may be a sub-shield of the radiation shield 105 like sub-shields 705A-B (see FIG. 7B), but in such examples the shadow shield 140 remains in-place after the decoupling of the radiation shield 105. The shadow shield 140 is typically not decoupled or ejected from the spacecraft 102 by the decoupling device 110. The shadow shield 140 is configured to protect the electronics 130. Consequently, the shadow shield 140 is smaller than the radiation shield 105 in both size and mass.

Balance of spacecraft 301 includes a sensitive volume 335 that can be protected from radiation flux of the radioisotope power unit 120 by the shadow shield 140. The sensitive volume 335 contains the electronics 130, payload 135, and other sensitive equipment arranged therein. The electronics 130, payload 135, and other sensitive equipment in the sensitive volume 335 may be less sensitive to radiated particles than human personnel 899, and can require less shielding than the radiation shield 105 is required to provide.

As further shown in FIG. 3B, the radioisotope power system 120 includes a thermoelectric module housing 315 and a thermoelectric generator 330. A description of a thermoelectric generator 330 is provided in the following publications of Ultra Safe Nuclear Corporation of Seattle, Washington: U.S. Patent Pub. No. 2023/0023052, published Jan. 26, 2023, titled "Fully Ceramic Encapsulated Radioactive Heat Source"; U.S. Patent Pub. No. 2023/0051201, published Feb. 16, 2023, titled "Chargeable Atomic Battery and Activation Charging Production Methods"; and International Patent Pub. No. WO 2021/159041, published Aug. 12, 2021, titled "Chargeable Atomic Battery with Pre-Activation Encapsulation Manufacturing."

Thermoelectric generator 330 includes thermoelectrics, such as an array of thermocouples, such as a thermopile, to convert the heat released by the decay of the radioisotope battery 220 in a radioactive state into electricity by the Seebeck effect. A thermopile is an electronic device that converts thermal energy into electrical energy and that includes several thermocouples as an array connected usually in series or, less commonly, in parallel. Thermoelectrics can include heavily doped semiconductors: semiconductors, which have so many free electrons that they have many properties that can generate electricity from the application of a temperature gradient, or vice versa, through the thermoelectric effect. For example, thermoelectrics can include solid-state devices that convert heat directly to electricity. Alternatively, the thermoelectric generator 330 can include other conventional means of converting heat into electricity e.g., fluid turbines.

If the spacecraft 102 includes an extendable boom 250 (see FIGS. 2 and 4A-B), then the thermoelectric module housing 315 can also be partially coupled to the extendable boom 250, which is further coupled to the balance of spacecraft 302. The thermoelectric generator 330 can include thermoelectrics coupled to the radioisotope power unit 120 to convert heat produced from radioactive decay of the radioisotope battery 220 into electrical power (e.g., electricity production). Alternatively, the radioisotope power unit 120 can be used as an independent heat source for direct heat applications.

Generally, heat produced by the radiation particles 892A-B (see FIG. 8) from the radioisotope battery 220 can be coupled to Stirling power converters, coolant/heating, or nuclear pulse propulsion systems. The heat can be utilized to provide thermal, electrical, or impulse energy for an external system requiring energy, such as satellites, lunar electronics, underwater vehicles, or remote heating devices. In the example of FIG. 3B, the heat can be thermally coupled to the thermal interface 215 and thermoelectric generator 330. Depending on the tolerance for radiation of these energy conversion means and any coupled electronic components, the thickness of any shadow shield 140 required may be greater. A conservative estimate for the tolerance of the electronics 130 is 25 kilorads (krad) in Silicon. Some electronics 130 can tolerate dose levels in the millirad (mrad) range. Techniques such as moving the electronics further from the radioisotope power unit 120 may help reduce the required mass of the shadow shield 140.

Figure 3C:
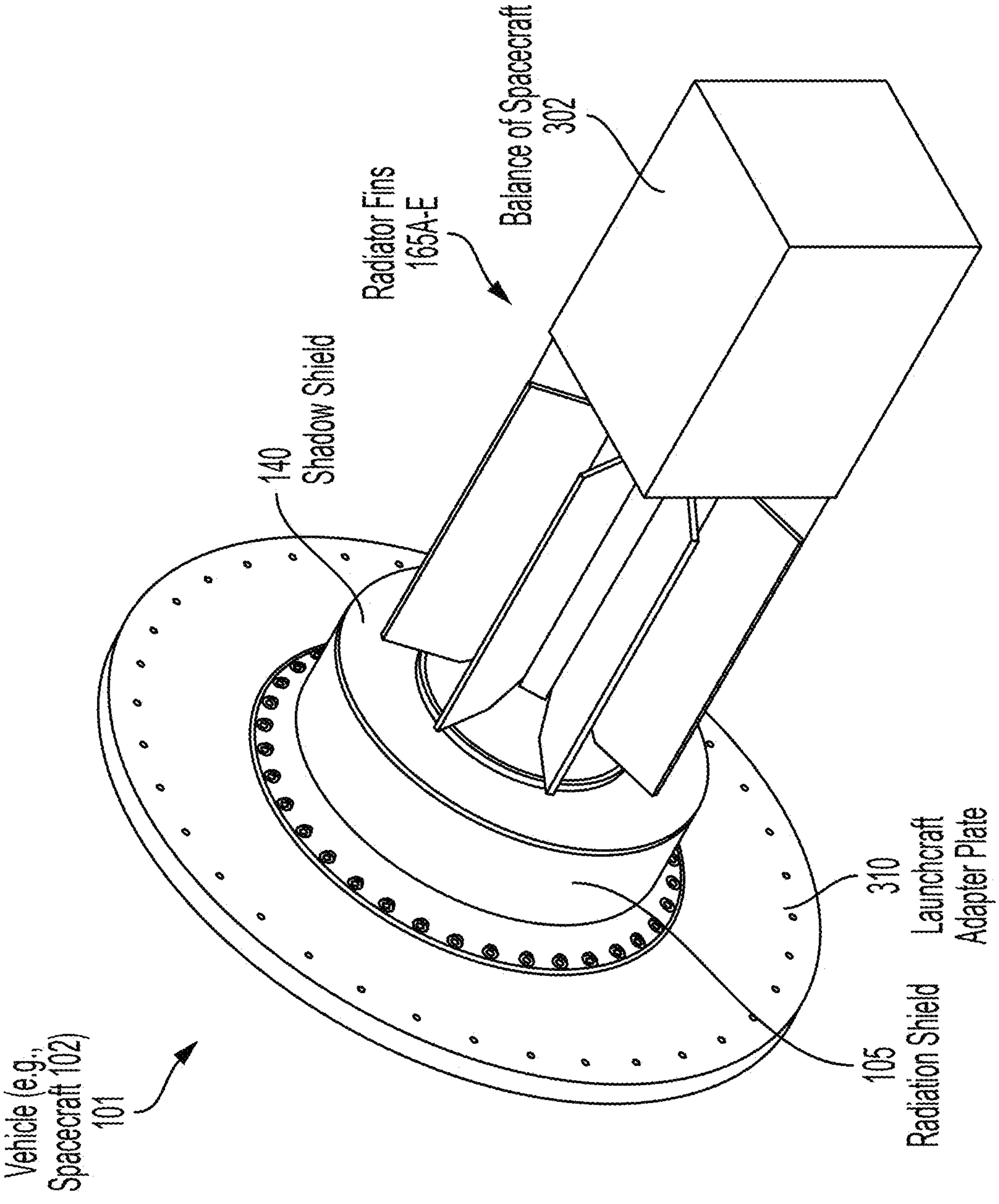
FIG. 3C is an isometric view of the spacecraft like that of FIGS. 3A-B, but depicting further details of the radiation shield, shadow shield, and radiator fins.

FIG. 3C is an isometric view of the spacecraft 102 like that of FIGS. 3A-B, but depicting further details of the radiation shield 105, shadow shield 140, and radiator fins 165A-E. Radiator fins 165A-E may be connected to the propellant tanks 160A-E as shown in FIGS. 1A-C, such that radiator fin 165A is connected to propellant tank 160A, radiator fin 165B is connected to propellant tank 160B, etc. The radiator fins 165A-E may also be offset from the propellant tanks 160A-E at the same position along the length of the spacecraft 102, or may be offset from one or more propellant tanks 160A-E along the length of the spacecraft 102, as in FIGS. 3A-B. The radiator fins 165A-E may exhibit radial symmetry around the spacecraft 102, or the radiator fins 165A-E may be unevenly distributed.

Spacecraft 102 includes a launchcraft adapter plate 310, which can be used to attach the spacecraft 102 to a launch vehicle capable of exiting Earth's atmosphere, referred to herein as a "launchcraft." The example spacecraft 102 may not have the incredibly high sustained power required to substantially exit Earth's gravitational pull, but rather the example spacecraft 102 instead has the power to achieve high velocity in a zero-gravity environment. The launchcraft, such as a traditionally-designed, to-orbit, heavy-lift launch vehicle like the Vulcan Centaur or a Falcon 9, would latch onto the launchcraft adapter plate 310, launch itself with the spacecraft 102 from Earth into orbit 711 (see FIG. 7B), and then release the spacecraft 102 once the spacecraft 102 is brought to orbit 711.

Figure 3D:
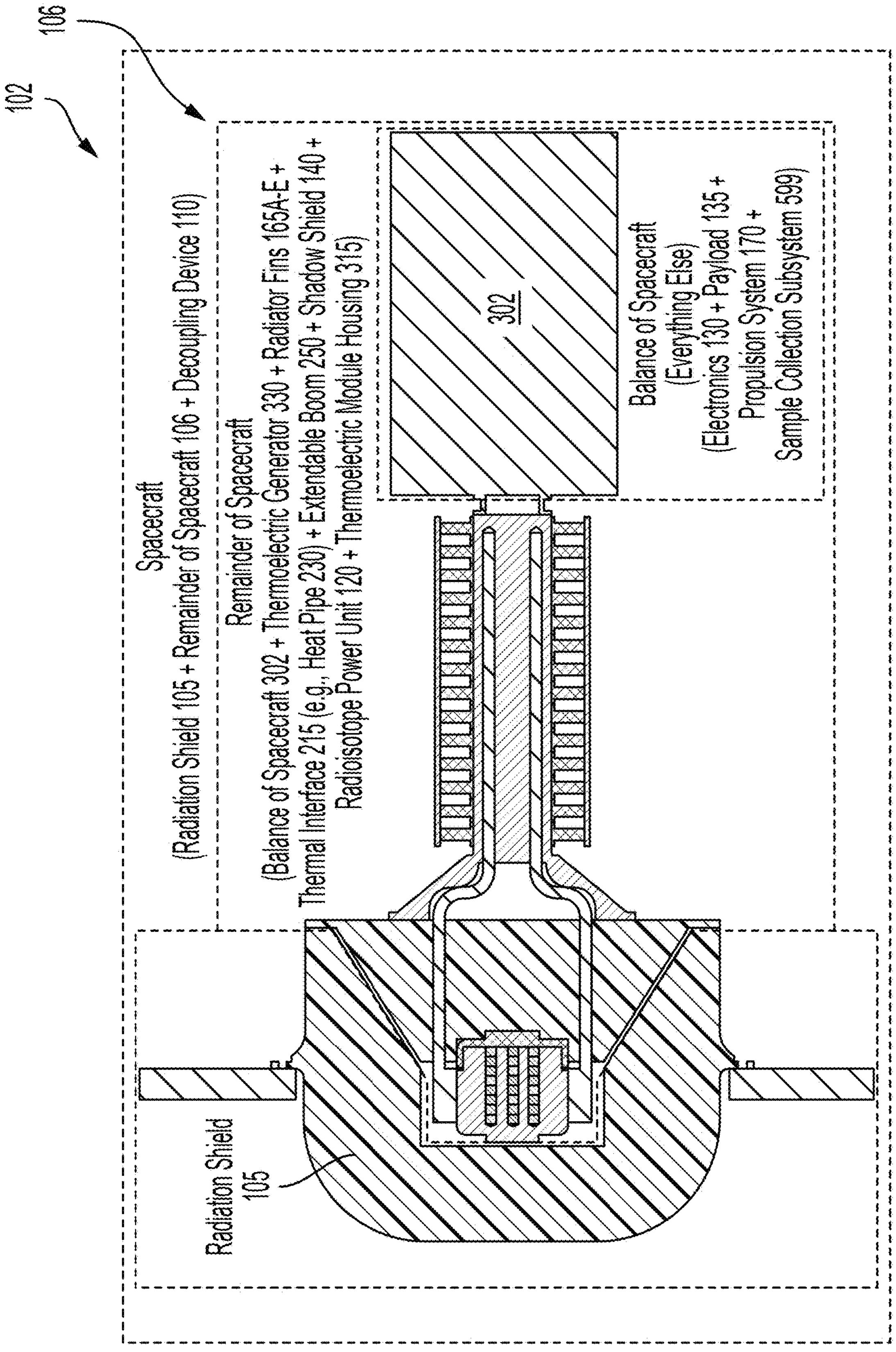
FIG. 3D is a cross-sectional view of the spacecraft like that of FIG. 3B, but delineating the spacecraft, radiation shield, remainder of spacecraft, and balance of spacecraft.

FIG. 3D is a cross-sectional view of the spacecraft like that of FIG. 3B, but delineating the spacecraft 102, radiation shield 105, remainder of spacecraft 106, and balance of spacecraft 302. The spacecraft 102 can initially constitute the entire vehicle 101, generally as the spacecraft 102 would appear before commencement of a mission. The spacecraft 102 is the summation of the radiation shield 105, the decoupling device 110, and the remainder of spacecraft 106.

When decoupling the radiation shield 105, the radiation shield 105 separates from the spacecraft 102. Upon decoupling, some or all of the decoupling device 110 may stay attached to the spacecraft 102, stay attached to the radiation shield 105, be destroyed, or may itself decouple and eject into outer space 701 (see FIGS. 7A-B). The portion of the spacecraft 102 that does not decouple from the spacecraft 102 and is not destroyed or melted during decoupling of the radiation shield 105 is the remainder of the spacecraft 106. Therefore, pre-decoupling, the spacecraft 102 exists as a single entity, the spacecraft 102. Post-decoupling, the spacecraft 102 can be divided into three entities: the first entity is radiation shield 105, the second entity is the decoupling device 110 (which may itself separate into sub-entities or be destroyed), leaving the remainder of the spacecraft 106 as the third entity. In some contexts, the remainder of the spacecraft 106 may be referred to as the spacecraft 102 in post-decoupling settings. The radioisotope power unit 120, radioisotope battery 220, and shadow shield 140 are a part of the remainder of spacecraft 106.

The remainder of spacecraft 106 can itself be divided into two general groups. The first group includes the elements of the remainder of spacecraft 106 that manage the heat and radiation from the radioisotope power unit 120, and utilize that heat and radiation to produce electricity. The member elements of the first group include the radioisotope power unit 120 (itself including the radioisotope battery 220), the radiator fins 165A-E, the shadow shield 140, the thermal interface 215 (e.g., heat pipe 230), the extendable boom 250, the thermoelectric module housing 315, and the thermoelectric generator 330. The second group, labeled the balance of spacecraft 302, includes the remaining elements of the remainder of spacecraft 106. The balance of spacecraft 302 includes, in part, the electronics 130; any payload 135, in particular radiologically sensitive payloads 135; the propulsion system 170; and any sample collection subsystem 599 (see FIG. 5A).

The balance of spacecraft 302 includes any component of the remainder of spacecraft 106 that is not directly involved in managing the heat or radiation from the radioisotope power unit 120, or utilizing that heat or radiation to produce electricity. The remainder of spacecraft 106 includes any component of the spacecraft 102 that is not decoupled from the spacecraft 102 upon the decoupling of the radiation shield 105.

Figures 4A, 4B:
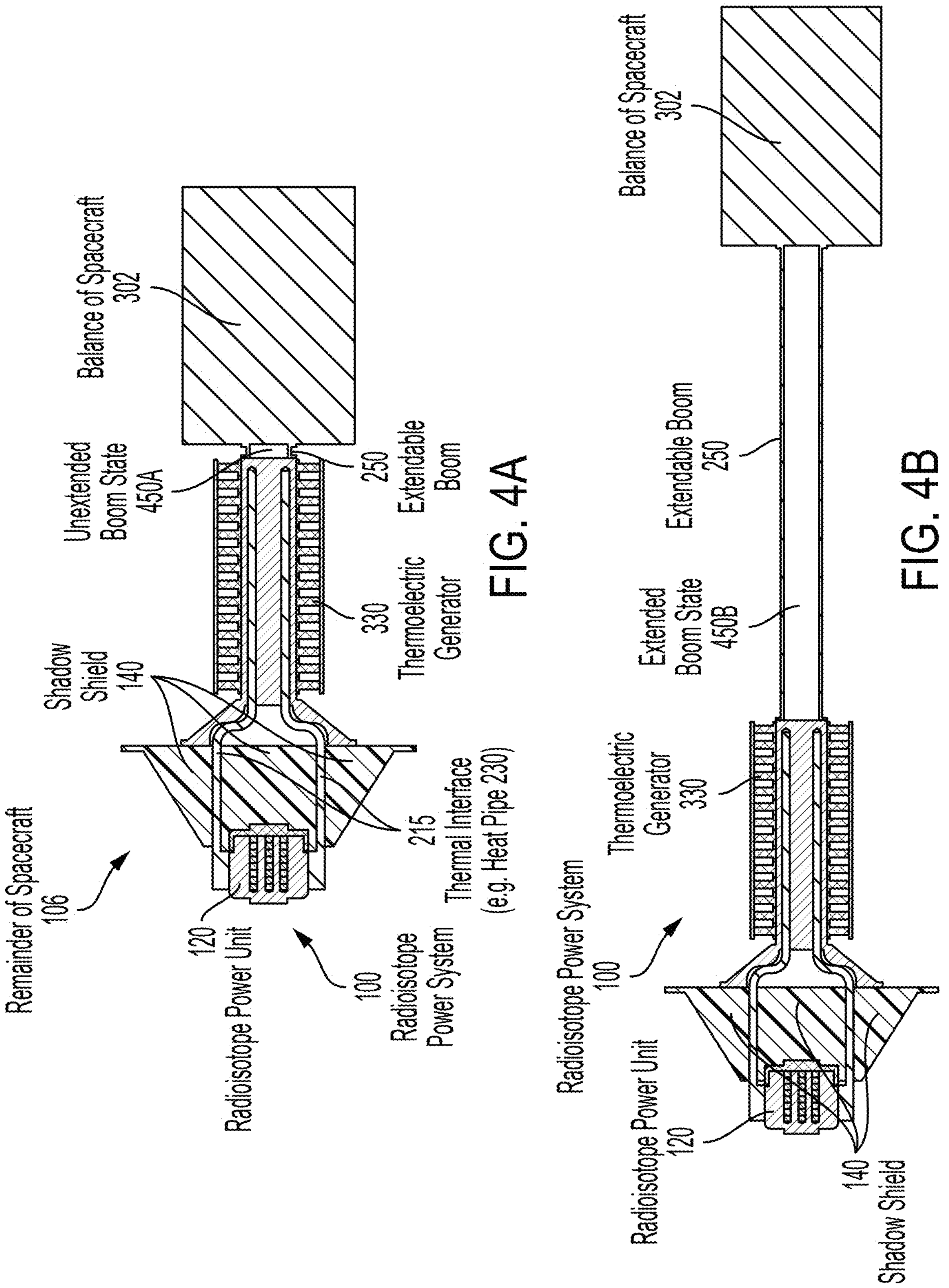
FIG. 4A is a cross-sectional view of the spacecraft of FIGS. 1A-C with the radiation shield decoupled from a remainder of the spacecraft, and the extendible boom in an unextended boom state.
FIG. 4B is another cross-sectional view of the spacecraft of FIGS. 1A-C with the radiation shield decoupled from the remainder of the spacecraft, but with the extendible boom in an extended boom state.

FIG. 4A is a cross-sectional view of the spacecraft 102 of FIGS. 1A-C with the radiation shield 105 decoupled from the remainder of the spacecraft 106, and the extendible boom 250 in an unextended boom state 450A. FIG. 4B is another cross-sectional view of the spacecraft 102 of FIGS. 1A-C with the radiation shield 105 decoupled from the remainder of the spacecraft 106, but with the extendible boom 250 in an extended boom state 450B. In FIGS. 4A-B, the radiation shield 105 is decoupled from the vehicle 101 (e.g., spacecraft 102). Therefore, all that remains of the spacecraft 102 is the remainder of spacecraft 106, which is the entire spacecraft 102 minus the radiation shield 105 and possibly some jettisoned components of the decoupling device 110. In the depiction of FIG. 4A, the radiation shield 105 from the spacecraft 102 is decoupled before extending the extendable boom 250. Alternatively, as in FIG. 4B, the extendable boom 250 can be extended before decoupling the radiation shield 105 from the spacecraft 102, and then the radiation shield 105 can be decoupled.

In FIG. 4A, the extendable boom 250 is depicted as being stored collapsed within itself in the unextended boom state 450A, and the radioisotope power system 100 is located near the balance of spacecraft 302. In FIG. 4B, as the extendable boom 250 enters the extended boom state 450B, the balance of spacecraft 302 is extended further away by some distance from the radioisotope power system 100. Further, any connections to any component controlled by the electronics 130 not within the balance of spacecraft 302 are likewise extended during the extended boom state 450B.

The effect of the shadow shield 140 can be increased by implementing the extendable boom 250 (see also FIG. 2) within the radioisotope power system 100. The extendable boom 250 stores in a collapsed state, and does not affect the flight profile of the spacecraft 102, barring a slight mass increase. When the spacecraft 102 is in the process of decoupling the radiation shield 105, the extendable boom 250 can be extended to provide multiple advantages. The volume of the spacecraft 102 protected by the shadow shield 140, primarily covering the balance of spacecraft 302 (see FIG. 3B), becomes larger as the extendable boom 250 moves the balance of spacecraft 302 away from the radioisotope battery 220—thereby allowing a less-wide or narrower shadow shield 140 to be used. The increased distance also improves the dispersion and attenuation of the radiation particles 892A-B before the radiation particles 892A-B (see FIG. 8) would reach the balance of spacecraft 302. Because the radiation dose decreases with the square of distance, a less-thick shadow shield 140 is enabled. Increasing the distance between the radiation shield 105 and the remainder of spacecraft 106 can reduce the risk or stress of utilizing the decoupling device 110, as the act of decoupling is occurring further away from the sensitive equipment of the spacecraft 102.

Figure 5B:
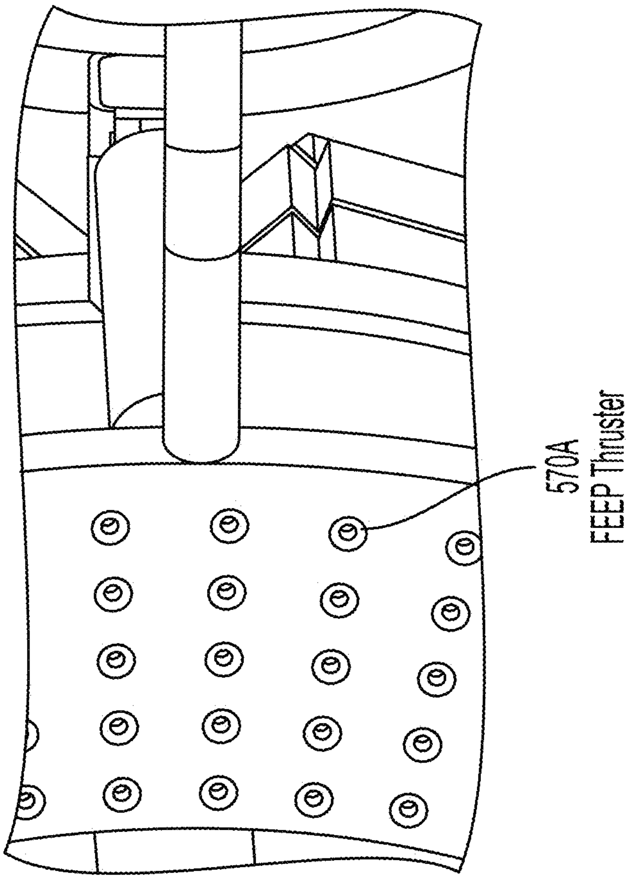
FIG. 5B is a detail area of the isometric view of FIG. 5A, depicting further details of one of the FEEP thrusters.

FIG. 5A is an isometric view of the bottom of the propulsion system 170 of the spacecraft 102 of FIGS. 1A-C and depicting a plurality of field-emission electric propulsion (FEEP) thrusters 570A-N. FIG. 5B is a detail area of the isometric view of FIG. 5A, depicting details of one of the FEEP thrusters 570A. A pump transfers propellant, in this example a liquid metal propellant, from the propellant tanks 160A-E through and then past the radioisotope battery 220 along the propellant flow path, through the thermal interface 215 (e.g., heat pipe 230), thermoelectric generator 330, and out the FEEP thrusters 570A-N.

Using liquid metal propellant removes the difficulties associated with the hydrogen ($H_2$) propellant normally used in NTP systems. Hydrogen propellant as used in many NTP concepts must be stored at cryogenic temperatures (<30 Kelvin (K)) and is a very low-density propellant. As such, the mass for tanks to store $H_2$ and equipment for keeping $H_2$ cryogenic have a large mass.

The thrust generated by the FEEP thrusters 570A-N propels the vehicle 101 that houses, is formed integrally with, connects, or attaches to the propulsion system 170. The vehicle 101 can be a rocket, drone, unmanned air vehicle (UAV), aircraft, spacecraft 102, missile, etc. The vehicle 101 can include various control nozzles for steering and other components. In the depicted example, the propulsion system 170 with the radioisotope battery 220 can be utilized in a space environment. As individual FEEP thrusters 570A are very small and provide little thrust, a large array of FEEP thrusters 570A-N can be used to propel the spacecraft 102. As shown, the FEEP thrusters 570A-N are mounted in a ring around the sample collection subsystem 599, on a gimbal mechanism which would allow for directional thrust.

Figure 6B:
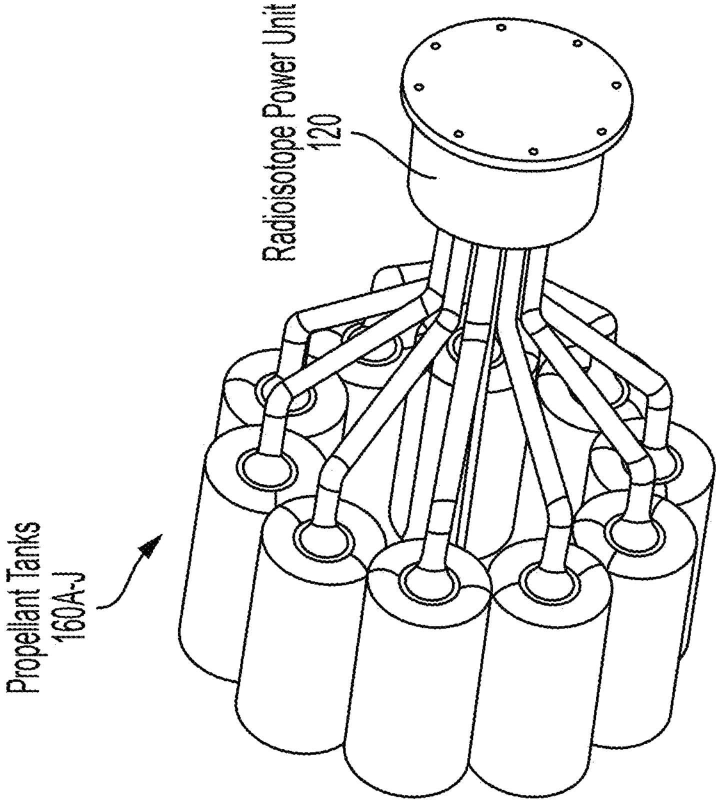
FIG. 6B is a perspective view of a propulsion system of another spacecraft like that of FIGS. 1A-C and 6A, but depicting a plurality (e.g. ten) of propellant tanks and the radioisotope power unit.
Figure 6A:
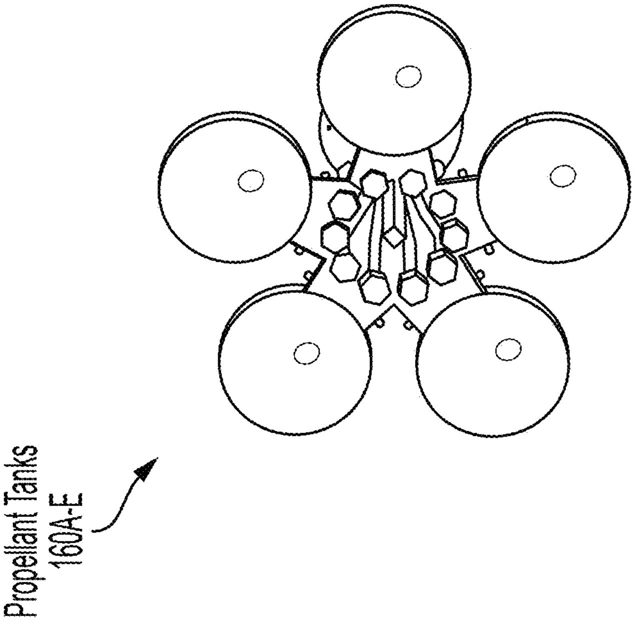
FIG. 6A is a perspective view of a propulsion system of the spacecraft of FIGS. 1A-C that depicts the plurality (e.g., five) of propellant tanks.

FIG. 6A is a perspective view of a propulsion system 170 of the spacecraft 102 of FIGS. 1A-C that depicts the plurality (e.g., five) of propellant tanks 160A-E. FIG. 6B is a perspective view of a propulsion system 170 of another spacecraft 102 like that of FIGS. 1A-C and 6A, but depicting a plurality (e.g. ten) of propellant tanks 160A-J and the radioisotope power unit 120.

Propellant tanks 160A-E store the liquid metal propellant used by the propulsion system 170. The metal propellant within the propellant tanks 160A-E may maintain a liquid state due to being heated directly or indirectly by the radioisotope power unit 120. To accomplish this, the spacecraft 102 contains conductive pathways between a cold end of the thermoelectric generator 330 (see FIG. 3B) and the propellant tanks 160A-E. Five propellant tanks 160A-E are depicted; however, the spacecraft 102 can include any number of propellant tanks 160A-N, including in particular ten propellant tanks 160A-J, are shown in FIG. 6B. The propellant tanks 160A-E may exhibit radial symmetry, or may be offset both around the radius of the spacecraft 102, as well as along the length of the spacecraft 102.

Propellants, such as indium, with low vapor pressure allow for propellant tanks 160A-E to be designed in non-spherical shapes. These shapes can be designed in long tubes in order to provide superior radiation shielding. The propellant tanks 160A-E can be low pressure, high density and thin walled—the preferred combination for shielding. The propulsion system 170, when implemented with FEEP thrusters 570A-N, enables use of liquid metal propellant, allowing the volumetrically shrinking of the spacecraft 102, as well as removing the pressurization requirements for the propellant tanks 160A-E. As the propellant tanks 160A-E empty of propellant, the propellant tanks 160A-E can be ejected, in a similar manner as the radiation shield 105 is decoupled by decoupling device 110. Further, because there are multiple propellant tanks 160A-E, they can be selectively ejected to continue to perform appropriate spot shielding.

Excess heat beyond that needed for thermal and electrical energy utilized by the spacecraft 102, including the heat used to maintain the liquid state of the metal propellant, must be radiated to the environment. Heat pipes (e.g., cesium-based) can be connected to the propellant tanks 160A-E and radiator fins 165A-E (e.g., graphite composite-based) to radiate the excess heat to the environment. In addition, some heat will be radiated through the bodies of the propellant tanks 160A-E themselves. The outer part of the propellant tanks 160A-E can be coated with a high-emissivity material, while the inner part of the propellant tanks 160A-E can be coated with a low emissivity material. This opposing coating strategy is utilized to avoid reradiating heat to other propellant tanks and to structural trusses and heat-sensitive components of the spacecraft 102.

The primary advantage of the five-propellant tank 160A-E system of the spacecraft 102 is reduced mass compared to the ten-propellant tank 160A-J system, due to the lower number of tank walls and relatively small size of the thermal pathways compared to the necessary size of the tank walls. In addition, the ten-propellant tank 160A-J system requires an increase in the overall volume of the spacecraft 102 in the radial and axial directions, due to the constraints of adding an annular tank with non-negligible volume around each of the heat pipe(s) 230.

The five-propellant tank 160A-E system configuration can be capable of ejecting emptied tanks 160A-E during operation. This enables further decreases in the mass of the spacecraft 102, thereby further increasing the change in velocity as the spacecraft 102 continues along its trajectory. For example, after ejection of propellant tank 160A, center of mass balance can be achieved via control of propellent level in remaining propellant tanks 160B-E. Propellant tanks 160A-E can be connected to both the electric propulsion system 170 and thermal pathways via a set of frangibolt actuator-equipped fasteners (e.g., titanium-nickel based), allowing for non-pyrotechnic fastener release. The propellant tanks 160A-E can then drift free from the spacecraft 102.

The ten-propellant tank 160A-J system has uniformity across the ten propellant tanks 160A-J in terms of heating, heat flow, and radiation. In addition, the ten propellant tank 160A-J system allows a radiator panel configuration that prevents an efficiency loss from a radiative perspective, slightly reducing overall radius of the spacecraft 102.

Figure 7B:
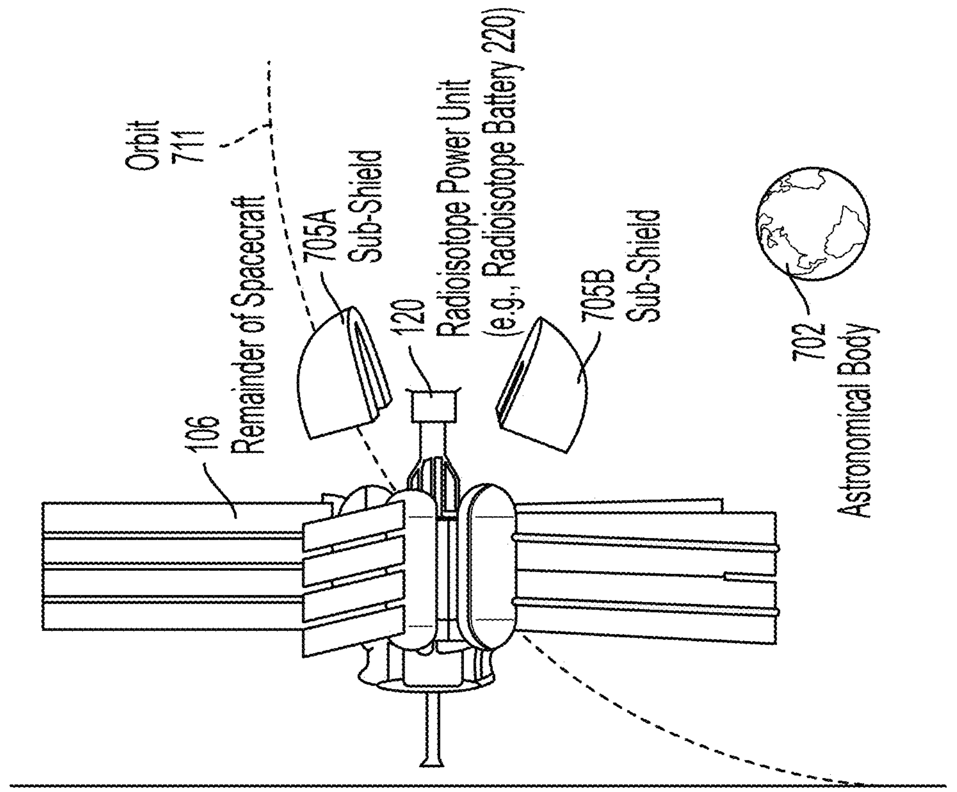
FIG. 7B illustrates the spacecraft of FIGS. 1A-C after decoupling of the radiation shield in an implementation where the radiation shield includes a plurality (e.g., two) of sub-shields.
Figure 7A:
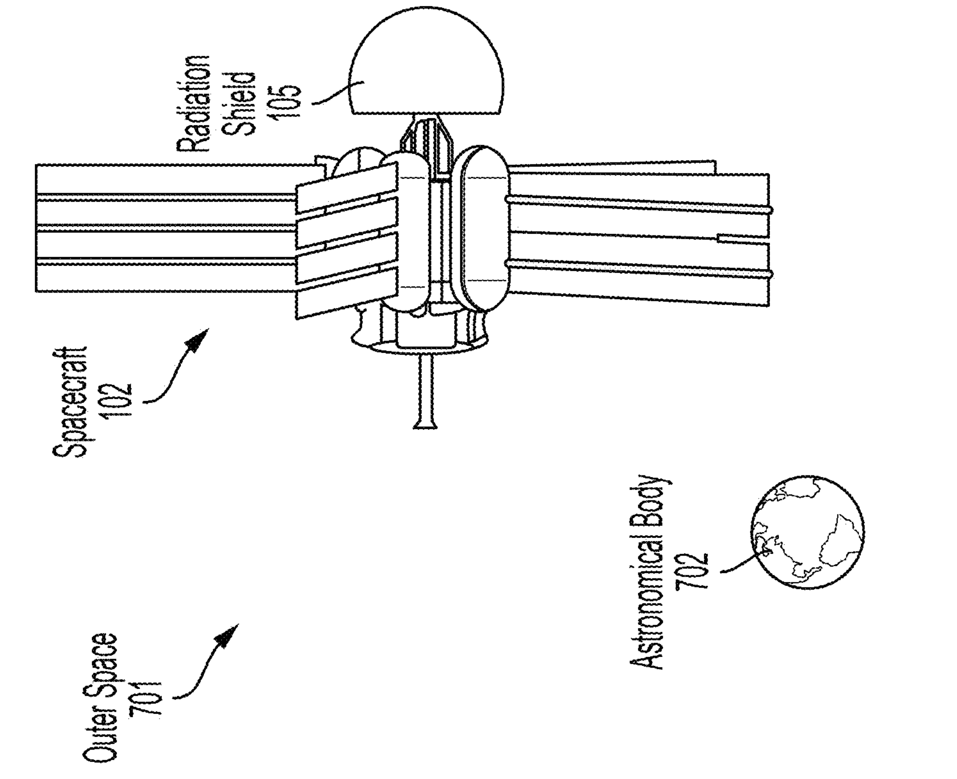
FIG. 7A illustrates the spacecraft of FIGS. 1A-C before decoupling of the radiation shield.

FIG. 7A illustrates the spacecraft 102 of FIGS. 1A-C before decoupling of the radiation shield 105. FIG. 7B illustrates the spacecraft 102 of FIGS. 1A-C after decoupling of the radiation shield 105 in an implementation where the radiation shield 105 includes a plurality (e.g., two) of sub-shields 705A-B. Generally, the radiation shield 105 can include or is implemented as an ejectable shield, and the decoupling device 110 can include an ejector to decouple the radiation shield 105 from the vehicle 101 by ejection. In the specific example shown in FIG. 7B, the radiation shield 105 can further include a plurality of sub-shields 705A-B. The plurality of sub-shields 705A-B are separated upon decoupling by one or more pyrotechnic or mechanical fasteners or actuators, or frangible nut and tension stud devices. More specifically, the plurality of sub-shields 705-B can be decoupled by the decoupling device 110. Decoupling device 110 can include one or more pyrotechnic or mechanical fasteners or actuators, or frangible nut and tension stud devices to separate the sub-shields 705A-B from the remainder of the spacecraft 106.

Decoupling device 110 can be further configured to decouple the radiation shield 105 when the vehicle 101 is in outer space 701 (see FIG. 7A). The decoupling device 110 can also be further configured to decouple the radiation shield 105 when the vehicle is in an orbit 711 of an astronomical object or an astronomical body 702 (see FIG. 7B). In yet another example (not shown in FIGS. 7A-B), the decoupling device 110 can be configured to decouple the radiation shield 105 by melting. The decoupling device 110 can comprise a heater for melting the radiation shield 105. The decoupling device 110 can utilize heat from the radioisotope power unit 120 for melting the radiation shield 105.

FIG. 8 depicts the radioisotope power system 100 of FIG. 2 showing a notional cutaway view of the radiation shield 105 and the shadow shield 140 enclosing the radioisotope power unit 120, and further depicting a plurality of radiation particles 892A-B and paths emitted by the radioisotope power unit 120. The sensitive volume 335 contains equipment arranged therein that is required to be protected from radiation flux. Radioisotope power system 100 includes a radioisotope battery 220 within the radioisotope power unit 120. Radioisotope battery 220 can be a chargeable atomic battery that is formed of a nuclear chargeable ceramic 802 that includes precursor material 859. Radioisotope battery 220 can generate many megawatts of thermal power (MWt) required to heat the metal propellant to a liquid state, as well as to power a power conversion system or thermoelectric generator 330 to ionize the liquid metal propellant for rocket thrust. The radioisotope battery 220 provides thermal energy to drive the FEEP thrusters 570A-N of the spacecraft 102.

Radiation shield 105 is depicted in FIG. 8 as a ring-like shape, but can be implemented as a three-dimensional shape that includes surfaces which are spherical, aspherical, planar or a combination thereof. Radioisotope battery 220 is substantially centered within the radiation shield 105. A shield thickness 805 determines the amount of attenuation of radiation particle 892A that radiation shield 105 is able to perform. Generally, increasing the shield thickness 805 of the radiation shield 105 results in greater attenuation of radiation. The relationship between shield thickness 805, a shield mass 1020 of the radiation shield 105, and a radiation shield mass per unit power 1030 (essentially the mass/energy efficiency of the radiation shield 105) are detailed in the table of radiation shield designs 1000 allowing a 5 mrem/hour dose rate in FIG. 10.

Radiation shield 105 may be thicker along vectors originating within the radioisotope battery 220 that pass through the radiation shield 105, and terminate in radiologically sensitive objects, or terminate in areas where radiologically sensitive objects are expected to be present within. Conversely, the radiation shield 105 may be thinner along vectors originating within the radioisotope battery 220 that pass through the radiation shield 105 and do not terminate in radiologically sensitive objects, or do not terminate in areas where radiologically sensitive objects are expected to be present within. If the radioisotope battery 220 is not a spherical or spheroid-like shape, the radiation shield 105 may be thicker along vectors which pass through longer portions of the radioisotope battery 220, as opposed to shorter portions of the radioisotope battery 220. In doing so, the radiation shield 105 may have dimensions roughly congruent but larger than that of the radioisotope battery 220.

In order to satisfy the requirements of sufficient shielding mass, minimizing total mass, and aerodynamics, material that is not as radiologically attenuating as the material of the radiation shield 105 may be inserted between the radiation shield 105 and the aeroshell 125. In an example the radiation shield 105 is best designed as a spherical-like shape to mass-efficiently and effectively shield the radioisotope battery 220. However, in this example the aeroshell 125 is best designed as a conical shape to improve aerodynamics. In such an example, stabilizing rods can connect the aeroshell 125 to the radiation shield 105 and a lighter filling, such as fire-retardant foam, may be injected around the stabilizing rods between the aeroshell 125 and the radiation shield 105. Hence, in the present example the aeroshell 125 can be coupled to the radiation shield 105 without materially increasing mass of the spacecraft 102.

Shadow shield 140 establishes a shadow shield protected arc 850 (e.g., the truncated cone shape) as a three-dimensional space whose boundaries are between the shadow shield 140 and beyond the shadow shield 140 in which radiation, such as second radiation particle 892B, is blocked by the shadow shield 140. Shadow shield protected arc 850 protects the electronics 130 (and other radiation sensitive equipment) in the sensitive volume 335 from radiation damage caused by second radiation particle 892B. Radiation shield 105 establishes a radiation shield protected arc 851 (e.g., the volume outside the truncated cone shape) as a three-dimensional space whose boundaries are between the radiation shield 105 and beyond the radiation shield 105 in which radiation such as radiation particle 892A is blocked by the radiation shield 105. Radiation shield protected arc 851 protects ground personnel 899 from harm caused by first radiation particle 829A while the radiation shield 105 remains coupled to the vehicle 101.

Typically, shadow shield protected arc 850 and radiation shield protected arc 851 partially overlap, but do not completely overlap. Therefore, individual radiation particles 892A-B emanating from the radioisotope battery 220 can be blocked along a variety of routes. Radiation shield 105 and shadow shield 140 can block x-ray and gamma radiation, including a variety of radiation particles 892A-B, such as alpha, beta, and gamma particles. However, due to their ability to travel through moderators with ease as compared to other radioactive particles 892A-B and the risk to equipment and human life they present, the shadow shield 140 and radiation shield 105 can be specifically designed to block gamma particles.

A first radiation particle 892A can strike the radiation shield 105 and is blocked. This blocking protects the ground personnel 899, but as the electronics 130 were not on the trajectory of the first radiation particle 892A, the radiation shield 105 does not protect the electronics 130 from the first radiation particle 892A on this first trajectory. A second radiation particle 892B can avoid the radiation shield 105, strike the shadow shield 140, and is blocked. This blocking protects the electronics 130, but as the ground personnel 899 were not on the trajectory of the second radiation particle 892B, the shadow shield 140 did not protect the ground personnel 899 from the second radiation particle 892B on this second trajectory.

Radioisotope power system 100 can also be temporarily implemented instead as a transient power plant in a terrestrial land application. For example, radioisotope power system 100 can provide nuclear power (e.g., thermal and/or electrical power) for remote region applications including outer space, celestial bodies, planetary bodies, and remotes regions on Earth. Therefore, the radioisotope power system 100 can also be implemented as a terrestrial power system, such as a nuclear electric propulsion (NEP) like system for a fission surface power (FSP) system. NEP powers electric thrusters such as a Hall-effect thruster for robotic and human spacecraft. FSP provides power for planetary bodies such as the moon and Mars. In the NEP and FSP power applications, the radioisotope power system 100 heats the propellant through a power conversion system (e.g., Brayton) to produce electricity.

Radioisotope battery 220 is included within the radioisotope power unit 120 (see FIG. 3B). If the radioisotope battery 220 is implemented as a CAB, the radioisotope power unit 120 can enclose or otherwise cover (e.g., partially or fully) the radioisotope battery 220 and can be selectively openable to charge the radioisotope battery 220, e.g., to enable the nuclear chargeable ceramic 802 to be accessed and removed in order to undergo irradiation by a particle radiation source. The radioisotope power unit 120 can be selectively closable when the radioisotope battery 220 is charged. Radioisotope power unit 120 is, in part, a structure used to aid in storing, transporting, securing, and retrieving energy from the radioisotope battery 220. The radioisotope power unit 120 can include an enclosure that includes conductive interface(s) for coupling to the thermal interface 215, such as the heat pipe 230 for thermal coupling of the radioisotope power unit 120 to the thermoelectric generator 330.

To charge the radioisotope battery 220, the radioisotope battery 220 is placed within range of subatomic particles being emitted by a particle radiation source. In this example, the particle radiation source can be a nuclear reactor core of a nuclear reactor and, as the radioisotope battery 220 resides within range of the subatomic particles being emitted by the particle radiation source, the radioisotope battery 220 is bombarded with subatomic particles. Alternative particle radiation sources can include more generalized fission reactors, fusion reactors, and particle accelerators. A fission reactor splits a heavy nucleus into two or more lighter nuclei, releasing kinetic energy, gamma radiation, and free neutrons. A fusion reactor combines two lighter atomic nuclei to form a heavier nucleus, while releasing energy. A particle accelerator is a machine that uses electromagnetic fields to propel charged particles to very high speeds and energies, and to contain them in well-defined beams.

Different implementations of the particle radiation source may use varying reaction pathways to irradiate the radioisotope battery 220, such as neutron reactions, proton/ion reactions, photon reactions, fission. Neutron activation is the reaction pathway process of a nuclide absorbing a neutron and becoming radioactive (n,γ). There are other reactions such as a (n,2n) or (n,p). Low energy neutrons (0-1 MeV) can be produced in high flux fission reactors and higher energy neutrons can be produced by fusion (<14.1 MeV) or using accelerators, which can produce a very high energy tailored neutron spectrum albeit at a lower flux level. Additionally, high energy proton, deuteron, and alpha particle reactions can interact with a nucleus of a precursor atom of the precursor material 859 to create radioisotopes through absorption, spallation, or other means. Recent advances in electron accelerators can produce high-flux high-energy gamma environments through Bremsstrahlung radiation. Several methods for producing medical isotopes have been shown using this method. Still further, a fission reaction produces two radioisotopes. The exact radioisotope produced is dependent upon the nuclide being fissioned and the incident neutron energy. The process can also be somewhat stochastic, there's a distribution of fission product yields for a given nuclide and incident neutron energy. There are many heavy nuclei, which are fissionable and will produce a different set of radioisotopes, providing many potential options for radioisotope production.

Currently available fission reactors can provide high fluxes of neutrons in thermal (energies around 0.253 eV) and to a lesser degree at higher energies up to 20 MeV. The high flux isotope reactor (HFIR) and the pressurized water Advanced Test Reactor (ATR) have produced isotopes such as Pu-238. For nuclear reactions that can be driven by low energy neutrons, fission reactors are excellent choices. Harvesting fission products is another method to produce the radioisotope battery 220, but it is challenging in that many different isotopes are produced, which requires radiochemistry to process.

While fusion reactors are not break even in terms of their energy gain, currently available D-T fusion reactors can provide 14.1 MeV neutrons at a moderate flux. In some cases, fusion and fission can be combined into a hybrid reactor to provide a higher neutron flux.

Accelerators are a well-known technology capable of accelerating charged particles to an incredibly high energy. Accelerators can provide a wide range of energies and can provide a beam energy tailored to the correct activation energy of the reaction desired. Accelerated protons, deuterons, and alpha particles can be used directly to produce many radioisotopes. Accelerated electrons can produce a predictable and controllable level of x-ray photons through Bremsstrahlung. These photon reactions can then be used to drive nuclear reactions and produce radioisotopes for the radioisotope battery 220. Accelerators are very flexible, but usually suffer from low flux. However, recent advances in accelerator technology from demand in the medical radioisotope industry have yielded potential production methods for significant quantities of radioisotopes.

Radioisotope power unit 120 may induce free neutron bombardment of the radioisotope battery 220 in some examples by being partially lined with a neutron reflector material. Alternatively, the radioisotope battery 220 can be removed from the radioisotope power unit 120 to facilitate more direct exposure of the radioisotope battery 220 to the subatomic particles, or to protect the radioisotope power unit 120 from being unduly exposed to subatomic particles from the particle radiation source and potentially experiencing radiation embrittling. As the radioisotope battery 220 is exposed to the subatomic particles, the precursor material 859 within precursor material particles 1151A-N (see FIG. 11) is exposed to those same subatomic particles. Radioisotope power unit 120 can include a body and lid formed of a non-radioactive material, such as graphite, carbon fiber, carbon bonded carbon fiber, or aluminum.

During charging (e.g., an initial charging cycle or a recharge cycle), the radioisotope battery 220 is placed inside or immediately adjacent to the particle radiation source. As noted above, the particle radiation source can be a nuclear reactor, such as a light water nuclear reactor or a heavy water nuclear reactor, which include a nuclear reactor core inside of a pressure vessel. The radioisotope battery 220 can be placed in the middle of the pressure vessel (e.g., within the nuclear reactor core) or a reflector region (e.g., an inner reflector region or an outer reflector region) of the pressure vessel. In the light water nuclear reactor, the radioisotope battery 220 can be placed in the middle (e.g., center) of the nuclear reactor. In another example, the radioisotope battery 220 can be placed within an outer reflector region in a periphery of the pressure vessel during charging. An example nuclear reactor suitable as a particle radiation source and that includes a pressure vessel, nuclear reactor core, fuel elements, inner reflector region, and outer reflector region is disclosed in U.S. Patent Pub. No. 2020/0027587, published Jan. 23, 2020, titled "Composite Moderator for Nuclear Reactor Systems," the entirety of which is incorporated by reference herein.

Radioisotope battery 220 is depicted with a cutaway section of the precursor material 859 which makes up the nuclear chargeable ceramic 802. Although the radioisotope battery 220 is shown as a cylinder shape in the example, the radioisotope battery 220 can be formed into a variety of different geometric shapes. For example, the radioisotope battery 220 can be a tile, e.g., polygonal shape (e.g., cuboid), spheroid, or other shapes that can include a planar surface, an aspherical surface, a spherical surface (e.g., cylinder, conical, quadric surfaces), a combination thereof, or a portion thereof (e.g. a truncated portion thereof). Alternatively or additionally, the radioisotope battery 220 can include one more freeform surfaces that do not have rigid radial dimensions, unlike regular surfaces, such as a planar, aspherical, or spherical surface.

Precursor material 859 can include thulium, cobalt, erbium, lutetium, or thallium. Alternatively or additionally, the precursor material 859 can include scandium, silver, hafnium, tantalum, iridium, promethium, europium, gadolinium, and terbium. The precursor material 859 may include unaltered elements, or the elements can be synthesized into a carbide or oxide for chemical stability and immobility. Additionally, the precursor material 859 can be any isotope capable of interacting with external radiation through as reaction pathways, such as absorbing external neutrons, which is then capable of emitting latent radiation into a stable state (e.g., the precursor material 859 can initially include a stable isotope). The isotope of the precursor material 859 can be part of an element, which may be part of a carbide, oxide or molecule that is selected during manufacturing. The precursor material 859 can be initially in a stable state (e.g., stable isotope) or an unstable state (unstable isotope or radioactively-unstable nuclide), but can be convertible into an activated state, generally as an activated material via irradiation by some particle radiation source. The activated material is a radionuclide, also referred to as a radioactive nuclide, radioactive isotope, or a radioisotope.

Precursor material 859 can include Neptunium-237, Thulium-169, Europium-151, Europium-153, Cobalt-59, etc. In one example, the precursor material 859 can include Neptunium-237 and is convertible into Plutonium-238 via irradiation by a particle radiation source. Neptunium-237 absorbs a neutron and becomes Neptunium-238. Neptunium-238 then undergoes beta decay to become Plutonum-238. In another example, the precursor material 859 can be initially manufactured in a stable state (e.g., a stable isotope) and therefore not radioactive immediately after manufacture. In this example, after the initial charging cycle a fraction or all of the precursor material 859 is activated into radioactive material (a radioactively-unstable nuclide or unstable isotope).

Additionally, the element, carbide, oxide, or molecule of the precursor material 859 can be selected based on a mission duration of the entire radioisotope power unit 120. Generally, the half-life of the selected activated material should be approximately at least as long as the mission duration. This will ensure consistent energy emissions during the entire mission, and generally the precursor material 859 under consideration when activated has half-lives in the range of 100 days to 1,200 years and can be catered to the performance needs of the mission. As used herein, half-life means the time duration that half of the unstable atoms in the activated state undergo radioactive decay.

Once irradiated, the precursor material particles 1151A-N emit radiation particles 892A-B. In this example, the precursor material 859 emits beta particles, but alpha particles, gamma particles, and x-rays may all be emitted, depending on which element or molecule is selected for the precursor material 859. Some radiation particles 892A-B (alpha, beta, gamma, x-ray) may be preferred depending on the deployment of the radioisotope power system 100. Selecting different precursor materials 859 allows for customization of a power format, half-life duration, and a wide range of alpha-, beta-, and gamma-emitting radioisotopes that a given precursor material 859 is transformed into when activated.

The mission duration is the length of time required to complete an assignment for which the spacecraft 102 and the radioisotope power system 100 are purpose-built to complete. For example, the mission duration of the Curiosity Mars Rover was twenty-three months upon reaching the surface of Mars. Because the radioisotope battery 220 emits radiation continuously once activated until depleted, the mission duration can be calculated from the date that activation of the precursor material 859 is completed. Continuing with the Curiosity Mars Rover example, had the Mars Rover been equipped with a radioisotope battery 220, the mission of the spacecraft 102 would be to provide power to the Mars Rover until the mission of the Mars Rover is completed. The required mission duration would have been at minimum thirty-one months. Twenty-three months to complete the mission of the Mars Rover upon Mars, and an additional eight months during which the Mars Rover, equipped with the activated radioisotope battery 220, travels from Earth to Mars. Further, if the radioisotope battery 220 was scheduled to wait six months after activation before being launched with the Mars Rover from Earth, the mission duration would have been at minimum thirty-seven months. The mission duration should be on the order of the average half-life of the radioisotopes within the radioisotope battery 220 or shorter, unless earlier segments of the mission require higher energy output—then the half-lives of the radioisotopes can be tailored to produce an average energy output meeting or exceeding the energy requirements of each mission segment.

To improve neutron absorption, the selected precursor material 859 can have a large enough neutron absorption cross section to stimulate a reaction but small enough to prevent self-shielding. A cross section is between fifteen barns to one hundred and twenty barns will have good performance, and a cross section between twenty-five barns to sixty barns can be ideal. Materials with a lower thermal cross section absorption can be very effective, such as Cobalt, with a thermal neutron absorption cross section of thirty-seven barns. However, there are many exceptions to this rule. Europium and Lithium, for example, have much larger cross sections (1,000+barns) and can perform well. If the thermal neutron cross section of the activated material is too large, the precursor material 859 may transmute into another radionuclide typically with a mismatched half-life. This transmutation is known as double activation, and is usually undesirable as it reduces the amount of the desired radioisotope and introduces a new isotope typically with a half-life that is much shorter or much longer than desired. However, Europium and Lithium, for example, have much larger cross sections and can perform well in some examples. Depending on the level of self-shielding, the geometries of the precursor material 859 and the radioisotope battery 220 can be tailored to maximize activation or power density. For example, Europium and Lithium having large neutron absorption cross sections can be made as thin as necessary to account for self-shielding.

The selected precursor material 859 can be sintered during manufacturing, and therefore a good precursor material 859 withstands a temperature of at least 1,500 Kelvin without undergoing melting during the sintering. This ensures the precursor material 859 can remain in the stable state, for example. In terms of operating temperature, the radioisotope battery 220 examples can be utilized over a wide range of temperatures—from well below freezing up to and exceeding 1,000 Kelvin (seven hundred and twenty-six degrees C. or 1,340 degrees F.).

The precursor material 859 selected can preferably benefit from being relatively abundant. Some natural elements have several isotopes each with their own cross section and activation isotopes. The precursor material 859 may be relatively easy to work with in terms of its chemical toxicity. Furthermore, the total mass of the precursor material 859 can be relatively small compared to the total mass of the radioisotope battery 220. In an example, depending on the isotope, the mass of the precursor material 859 can be one-percent (1%) or less of the mass of the radioisotope battery 220. Some precursor materials 859 can be enriched to improve performance. The radioisotope battery 220 presented here if implemented as a CAB can use natural non-isotopically enriched precursor material 859. Alternatively, isotopically enriched precursor materials can be used to obtain a higher concentration of the desired activated isotope.

Figure 9:
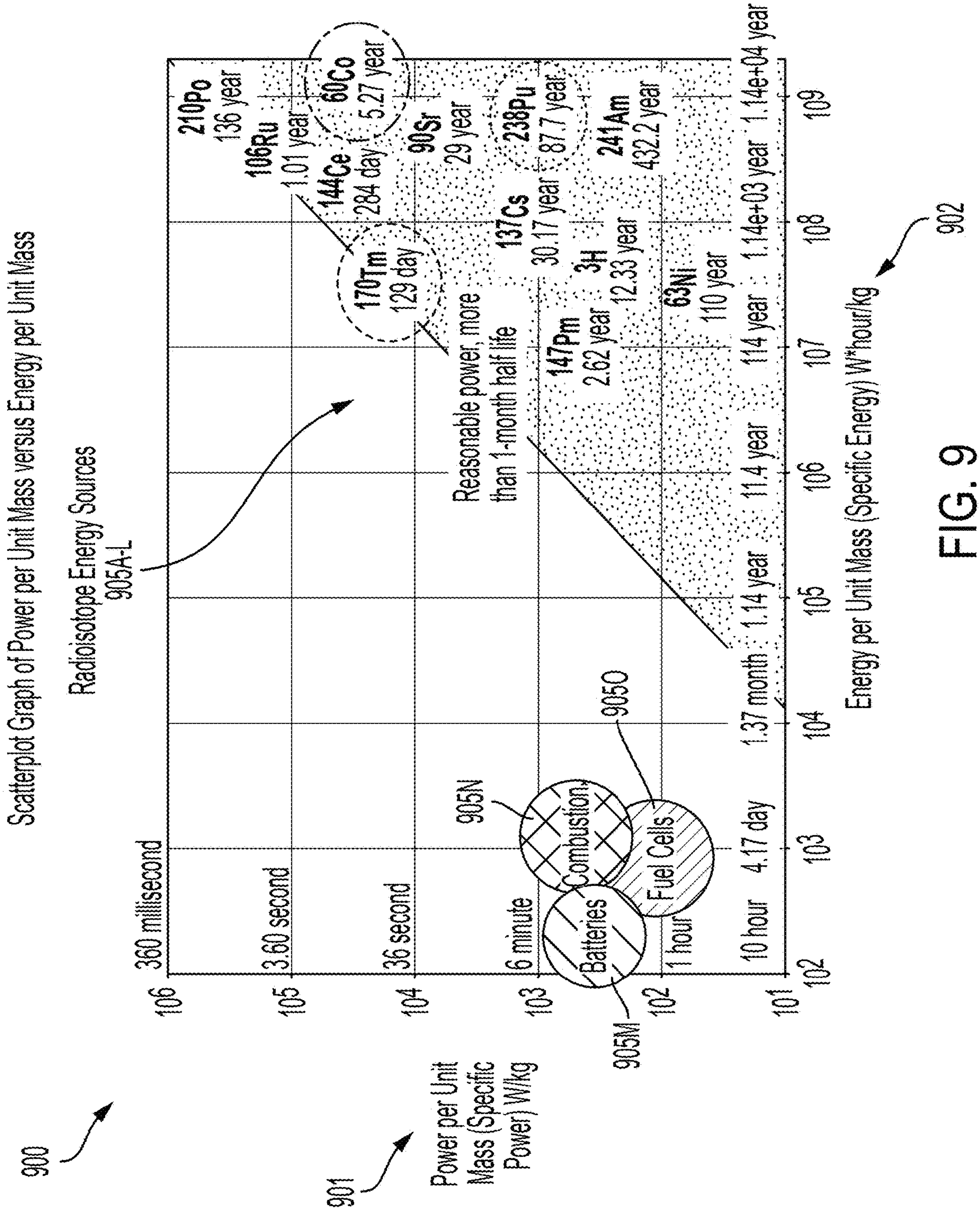
FIG. 9 is a scatterplot graph charting the power per unit mass versus the energy content per unit mass of various radioisotopes for the radioisotope battery of FIG. 8, as well as of chemical batteries and fossil fuels.

FIG. 9 is a scatterplot graph 900 charting the power per unit mass versus the energy content per unit mass of various radioisotopes for the radioisotope battery 220 of FIG. 8, as well as of chemical batteries and fossil fuels. Traditional energy sources, such as chemical batteries 905M, combustion fuel 905N, and fuel cells 905O, all lack the energy per unit mass 902 for a vehicle 101, such as spacecraft 102, to perform an extrasolar object interception, for example. Chemical batteries 905M, combustion fuel 905N, and fuel cells 905O can provide energy on the scale of hours, not the years required for the spacecraft 102 to maintain and build velocity to intercept an extrasolar object.

Radioisotopes energy sources 905A-L contain on the order of one million times the energy density of state-of-the-art chemical batteries 905M and fossil fuels, such as combustion fuel 905N and fuel cells 905O. There are differences in the total amount of energy stored within radioisotopes ranging from one hundred and seven to one hundred and nine Watt hour/kilogram (Wh/kg). However, the specific power Wh/kg is determined by both the energy and the half-life. Isotopes with shorter half-lives will have a higher power density. Pu-238 and Co-60 have a similar amount of energy, however the shorter half-life of Co-60 means that energy is released over a shorter period increasing the power density by a factor of thirty. Radioisotope energy sources 905A-L produce high temperature heat which is beneficial for compact power conversion devices—the higher temperatures allow for higher efficiencies and allow for heat rejection, which greatly minimizes mass of the spacecraft 102.

There is a direct relationship between power and the quantity of radioisotope and number of Curies of radioisotope. Each gram of Co-60 is approximately $1\times10^{22}$ atoms. This translates to $4.2\times10^{13}$ decays per second. In Curies, this translates to $1.126\times10^{3}$ Curies of Co-60 per gram of Co-60. Each decay of an atom possesses 2.6 MeV of energy, which translates to the 17.4 W/g of Co-60. In terms of Curies, each Curie of Co-60 possesses approximately 15.4 mW of power. The Co-60 can take the form of a mW or μW scale radioisotope battery 220.

FIG. 10 is a table of radiation shield designs 1000 allowing 5 mrem/hour dose rate depicting the shield thickness 805A-D and shield mass 1020A-D of the radiation shield 105 required to properly shield from a radioisotope generating the identified amount of power. Four shield designs 1002A-D for the radiation shield 105 are shown that achieve a target 5 rem/hour dose rate, including a respective power level 1010A-D, shield thickness 805A-D, shield mass 1020A-D, and mass per unit power 1030A-D. As shown, across the shield designs 1002A-D the radiation shield mass 1020A-D required to achieve a particular power level 1010A-D while only allowing the 5 mrem/hour dose rate is not linear. Larger power levels 1010A-D benefit from reduced mass per unit power 1030A-D.

Table of radiation shield designs 1000 is directed to Co-60 radioisotopes and the radiation produced by a radioisotope battery 220 containing those radioisotopes. For each shield design 1002A-D, a shield thickness 805A-D required to sufficiently reduce the radiation produced by the radioisotope battery 220 at a given power level 1010A-D (e.g., given wattage output) to the 5 mrem/hour dose rate is depicted. Moreover, for each shield design 1002A-D, a shield mass 1020A-D required for the given shield thickness 805A-D to sufficiently reduce the radiation produced by the radioisotope battery 220 at the given power level 1010A-D to the 5 mrem/hour dose rate is further shown. Finally, for each shield design 1002A-D, mass per unit power 1030A-D is depicted, which is the shield mass 1020A-D divided by the given power level 1010A-D.

With respect to the shield mass 1020A-D, shielding material attenuates the high-energy photons emitted by the radioisotope power unit 120 in an exponential fashion. However, there is also a strong geometric effect that reduces dose by increasing the size of the radiation shield 105, where dose is inversely proportional to the radius squared. The mass, however, is proportional to the radius of the radiation shield 105 cubed. In an example, a 19-centimeter (cm) radiation shield 105 would provide a $4\times10^{12}$ reduction in intensity, enabling for safe transit of the spacecraft 102 to a launch site and handling by ground crews made up of ground personnel 899 (see FIG. 8). Such a four pi steradians radiation shield 105 formed of depleted Uranium can have a mass of approximately 3,160 kilograms (kg) and would limit exposure of ground personnel 899 assembling the spacecraft 102 to less than 2 mrem/hour one meter from the surface of the radiation shield 105.

These calculations presume a radioisotope battery 220 of a reasonable size. The analysis was completed using a one-dimensional spherical geometry deterministic code and included an inner region composed of a radioisotope battery 220 according to power density, a thin tungsten housing, and an outer region comprising the radiation shield 105. Therefore, the radius of the radiation shield 105 includes the shield thickness 805 plus: (1) the radius of the radioisotope battery 220 if the radioisotope battery 220 is a spheroid shape; (2) half the length of the radioisotope battery 220 if the radioisotope battery 220 is a parallelepiped shape; or (3) a vector from the center of the radioisotope battery 220 to the surface of the radioisotope battery 220 if the radioisotope battery 220 is an irregular shape. A disproportionately large radioisotope battery 220 can require a proportionately larger radius of the radiation shield 105 (and therefore shield mass 1020) for the same shield thickness 805.

For some use cases, limiting exposure of ground personnel 899 assembling the spacecraft 102 to less than 2 mrem/hour one meter from the surface of the radiation shield 105 is not the distance from the surface of the radiation shield 105 at which the amount of roentgen equivalent man (rem) is to be measured. The radiation tolerance at closer distances may be of higher importance and therefore those closer distances set the radiation attenuation standard. In those use cases, as an example, the radiation shield 105 can be configured to reduce an amount of radiation penetrating the radiation shield 105 measured at a distance of 30 centimeters (cm) away from the radiation shield to less than or equal to approximately 100 mrem per hour (mrem/hr). To satisfy varying radiation attenuation standards, depending upon mission and deployment specifics, the radiation shield 105 can have a mass of approximately 10 kilograms (kg) to 3,160 kg. Moreover, the radiation shield 105 can have a shield thickness 805 of approximately 12 centimeters (cm) to 20 cm. Larger shield masses 1020, up to tens of thousands of kilograms, with shield thicknesses 805 of several meters, are possible. Such a larger radiation shield 105 may provide higher mass per unit power 1030 for a much higher power-production radioisotope power unit 120 producing mega, giga, or terawatts of energy.

The example spacecraft 102 without the radiation shield 105 (i.e., remainder of spacecraft 106) can have a mass of approximately 1,200 kg, and when paired with the approximately 3,000 kg radiation shield 105, the spacecraft 102 can have a mass over 4,000 kg. The radiation shield 105 protects ground personnel 899 (see FIG. 8), and can protect an impact site during a launch accident scenario. However, once beyond the Earth's atmosphere and in or beyond Earth's orbit 711 (see FIG. 7B), the radiation shield 105 provides minimal utility, and provides a substantial mass burden to thrust as 75% of the launched mass of the spacecraft 102 is the radiation shield 105. Propelling the spacecraft 102 through outer space 701 can be far more efficient if the mass of the radiation shield 105 is decoupled by the decoupling device 110.

Figure 11:
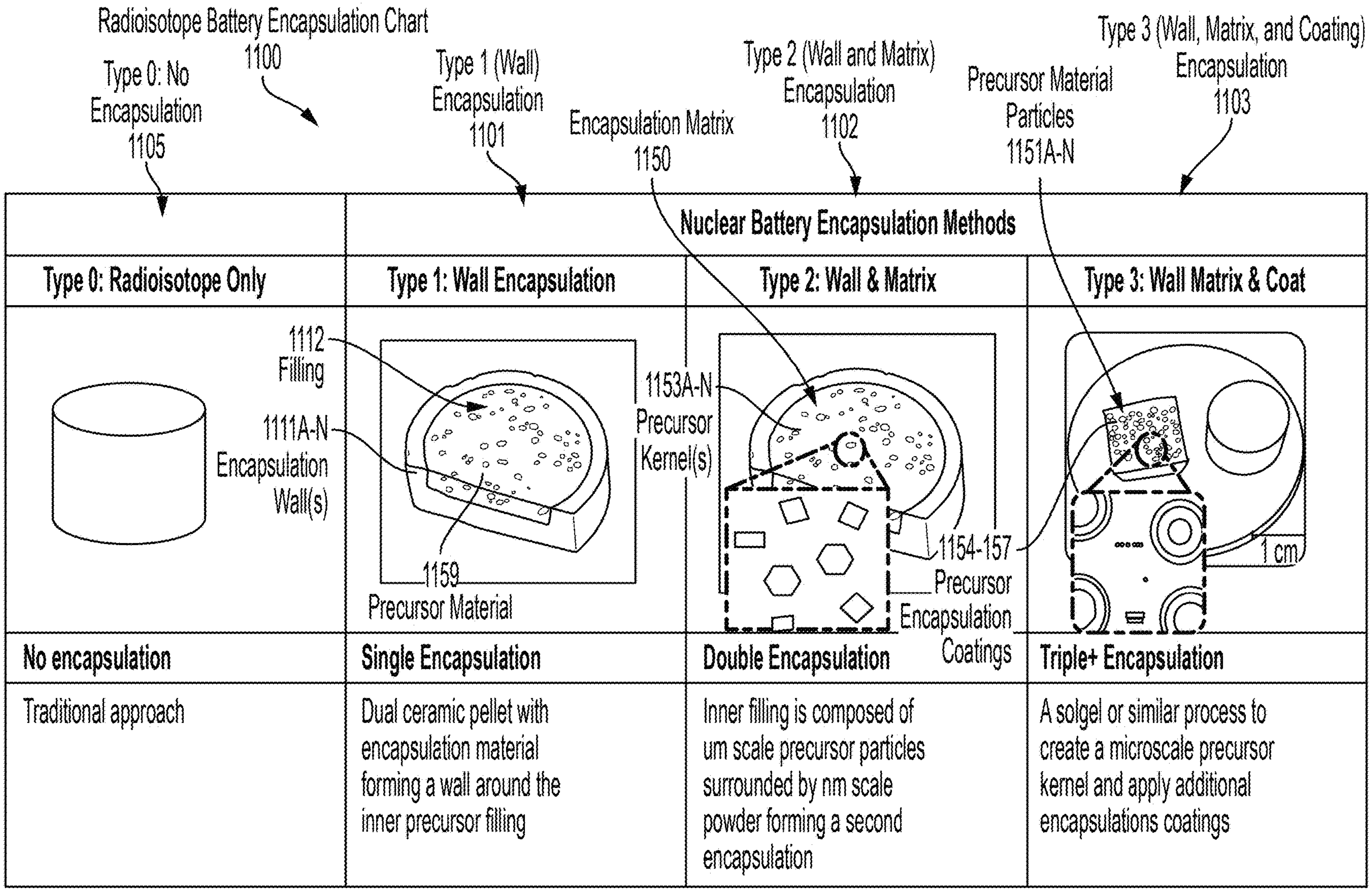
FIG. 11 depicts a radioisotope battery encapsulation chart of three types of encapsulation techniques for the radioisotope battery of the radioisotope power unit compared to a traditional atomic battery approach with no encapsulation.

FIG. 11 depicts a radioisotope battery encapsulation chart 1100 of three types of encapsulation techniques for the radioisotope battery 220 of the radioisotope power unit 120 compared to a traditional atomic battery approach with no encapsulation. Radioisotope battery encapsulation chart 1100 shows, in great detail, the three different filling configurations of: type 1 (wall) encapsulation 1101, type 2 (wall and matrix) encapsulation 1102, and type 3 (wall, matrix, and coating) encapsulation 1103.

Type 1 (wall) encapsulation 1101 is comprised fully of encapsulation wall(s) 1111A-N formed of encapsulation material 1152 around a filling 1112 of the precursor material 859. Precursor material 859 can be in the filling 1112 inside an interior volume (e.g., cavity) of the encapsulation material 1152. A body that includes one or more encapsulation walls can be formed of the encapsulation material 1152. The encapsulation walls 1111A-N include one or more exterior (e.g., outer) encapsulation walls and one or more interior (e.g., inner) encapsulation walls. The interior encapsulation walls interface the filling 1112 formed of the precursor material 859 (and activated material if converted into an activated state and/or decayed material). Interior encapsulation walls surround an interior volume of the encapsulation material 1152 that is filled with or lined with the precursor material 859 (and activated material if converted into the activated state and/or decayed material). The optional exterior and interior encapsulation walls 1111A-N can be continuous or discontinuous surfaces. The body of encapsulation walls 1111A-N can be circular or oval shaped (e.g., a spheroid, cylinder, tube, or pipe). The body of encapsulation walls 1111A-N can be square or rectangular shaped (e.g., cuboid) or other polygonal shape. The one or more interior encapsulation walls 1111A-N of the encapsulation material 1152 can be one continuous interior encapsulation wall 1111A surrounding the filling of the precursor material 859 (and activated material if converted into the activated state and/or decayed material). Alternatively, the one or more interior encapsulation walls 1111A-N formed of the encapsulation material 1152 can be a plurality of discontinuous interior encapsulation walls, which depend on the shape of the filling 1112 in the interior volume of the encapsulation material 1152. If the filling 1112 is a spheroid in three-dimensional space, then there is one continuous interior encapsulation wall 1111A of the encapsulation material 1152 in the interior volume surrounding the precursor material 859. If the filling 1112 is a cuboid or polygonal shape in three-dimensional space, then there is a plurality of continuous interior encapsulation walls 1111A-N of the encapsulation material 1152 in the interior volume surrounding the precursor material 859.

Type 2 (wall and matrix) encapsulation 1102 is comprised of an encapsulation matrix 1150 that is a continuous matrix formed of encapsulation material 1152 fully surrounding small precursor kernel(s) 1153A-N of precursor material 859.

Type 3 (wall, matrix, and coating) encapsulation 1103 is like type 2 (wall and matrix) encapsulation 1102, but includes precursor encapsulation coatings 1154-1157 of encapsulation material 1152 surrounding the precursor kernel(s) 1153A-N formed as precursor material particles 1151A-N. The encapsulation material 1152 may include one or more distinct materials. For example, the wall, matrix, and coating encapsulation can be composed of different chemical compounds, but are collectively referred to as being formed of encapsulation material 1152.

In type 0 (no encapsulation) 1105, which is the traditional atomic battery approach, there is no encapsulation and no precursor material 859, just a radionuclide that is not encapsulated. In some examples, the radioisotope battery 220 of the radioisotope power unit 120 can implement the type 0 (no encapsulation) 1005 approach of the traditional atomic battery (e.g., radioisotope only).

In the case of multiple encapsulation materials, such as type 2 (wall and matrix) encapsulation 1102 and type 3 (wall, matrix, and coating) encapsulation 1103 if the encapsulation walls 1111A-N have negligible activation, the encapsulation matrix 1150 and precursor encapsulation coatings 1154-1157 can have some activation as long as they serve a function. As a purely illustrative example, Iron will activate in a low yield cross-section to produce the radioisotope Fe-55. However, Iron may, for example, provide a structural benefit and could be included in the encapsulation matrix 1150 or precursor encapsulation coatings 1154-1157 to improve the safety features of the radioisotope battery 220.

In an example, the radioisotope battery 220 incorporating the precursor material 859 in the precursor material particles 1151A-N and implemented as a CAB can remedy the following deficiencies of traditional atomic batteries. With respect to radiochemistry, manufacturing traditional atomic batteries often requires a significant amount of radiochemical efforts. Traditional materials need to be irradiated and separated in a radiation certified laboratory. Waste products require proper disposal. Some materials, such as Plutonium, are classified as special nuclear materials and require significant security. This complexity drives up cost, especially capital expenditures on facilities which can take many years to make.

Radioisotope battery 220 can be formed of a precursor compact that includes precursor material particles 1151A-N embedded inside an encapsulation matrix 1150. Hence, the radioisotope battery 220 is shown as comprised of precursor material particles 1151A-N embedded inside the encapsulation matrix 1150 formed of an encapsulation material 1152. The encapsulation material 1152 can be a high-temperature carbide. Precursor material particles 1151A-N can include a precursor kernel 1153A-N surrounded by one or more optional precursor encapsulation coatings 1154-1157 (e.g., layers). The precursor material particles 1151A-N can include tristructural-isotropic (TRISO) precursor material particles. Alternatively or additionally, the precursor material particles 1151A-N can include bistructural-isotropic (BISO) precursor material particles. TRISO-like coatings may be simplified or eliminated depending on safety implications and manufacturing feasibility. Precursor material particles 951A-N, such as TRISO precursor material particles, are designed to withstand fission product build up inside a nuclear reactor and may not always be beneficial in a radioisotope battery context. Although the precursor material particles 1151A-N in the example include coated precursor material particles, such as TRISO precursor material particles or BISO precursor material particles, the precursor material particles 951A-N can include uncoated precursor material particles.

Encapsulation material 1152 includes silicon carbide, zirconium carbide, titanium carbide, niobium carbide, tungsten, molybdenum, or a combination thereof. Silicon carbide may be advantageous over the other materials to form the encapsulation material 1152 because titanium carbide, niobium carbide, tungsten, molybdenum may have too great of activation cross section. Each of the precursor material particles 1151A-N can include one more optional precursor encapsulation coatings 1154-1157 around a filling 1112. In one example, the precursor material particles 951A-N can include the filling 1112, a precursor kernel, surrounded by a first precursor encapsulation coating (e.g., porous carbon buffer layer) 1154, a second precursor encapsulation coating (e.g., an inner pyrolytic carbon layer) 1155, a third precursor encapsulation coating (e.g., a ceramic layer) 1156, and a fourth precursor encapsulation coating (e.g., an outer pyrolytic carbon layer) 1157.

Of the possible encapsulation material 1111A-N within which to embed the precursor material particles 1151A-N that form the radioisotope battery 220, silicon carbide (SiC) offers good irradiation behavior, and good fabrication behavior. SiC has excellent oxidation resistance due to rapid formation of a dense, adherent silicon dioxide ($SiO_2$) surface scale on exposure to air at elevated temperature, which prevents further oxidation.

When the precursor material particles 1151A-N are implemented as TRISO precursor material particles, the TRISO precursor material particles 1151A-N include four precursor encapsulation coatings (e.g., layers) of three isotropic materials. For example, the four precursor encapsulation coatings can include: (1) a porous buffer layer 1154 made of carbon; followed by (2) a dense inner pyrolytic carbon (PyC) layer 1155; followed by (3) a binary carbide layer 1156 (e.g., ceramic layer of SiC or a refractory metal carbide layer) to retain fission products at elevated temperatures and to give the TRISO precursor material particles 1151A-N a strong structural integrity; followed by (4) a dense outer PyC layer 1157. The refractory metal carbide layer of the TRISO precursor material particles 1151A-N can include at least one of titanium carbide (TiC), zirconium carbide (ZrC), niobium carbide (NbC), tantalum carbide, hafnium carbide, ZrC—$ZrB_2$ composite, ZrC—$ZrB_2$—SiC composite, or a combination thereof. The encapsulation matrix 1150 can be formed of the same material as the binary carbide layer of the TRISO precursor material particles 1151A-N.

TRISO precursor material particles 1151A-N are designed not to crack due to the stresses or fission gas pressure at temperatures beyond 1,600° C., and therefore can contain the precursor kernels 1153A-N formed of the precursor material 859 in the worst of accident scenarios.

TRISO precursor material particles 1151A-N were originally designed for use in high-temperature gas-cooled reactors (HTGR) that include the particle radiation source as a nuclear reactor core and to be operating at temperatures much higher than the temperatures of LWRs. TRISO precursor material particles 1151A-N have extremely low failure below 1500° C. Moreover, the presence of the encapsulation material 1152 provides an additional robust barrier to radioactive product release.

The encapsulation matrix 1150, and any precursor encapsulation coatings 1154-1157 of the precursor material particle 1151A may all be composed of different chemical compounds. But those chemical compounds should satisfy one or more of the following criteria: high temperature capability; chemical non-reactivity during manufacturing, charging, or operation; mechanical strength; crack propagation resistance; diffusion or other means of radionuclide transfer through grains on grain boundaries resistance; significant degradation of material properties during irradiation or charging resistance; favorable thermodynamic properties (such as thermal conductivity); or a low nuclear activation cross section. These criteria are not exhaustive, and there may be other criteria depending on the application of the radioisotope battery 220.

Figure 12:
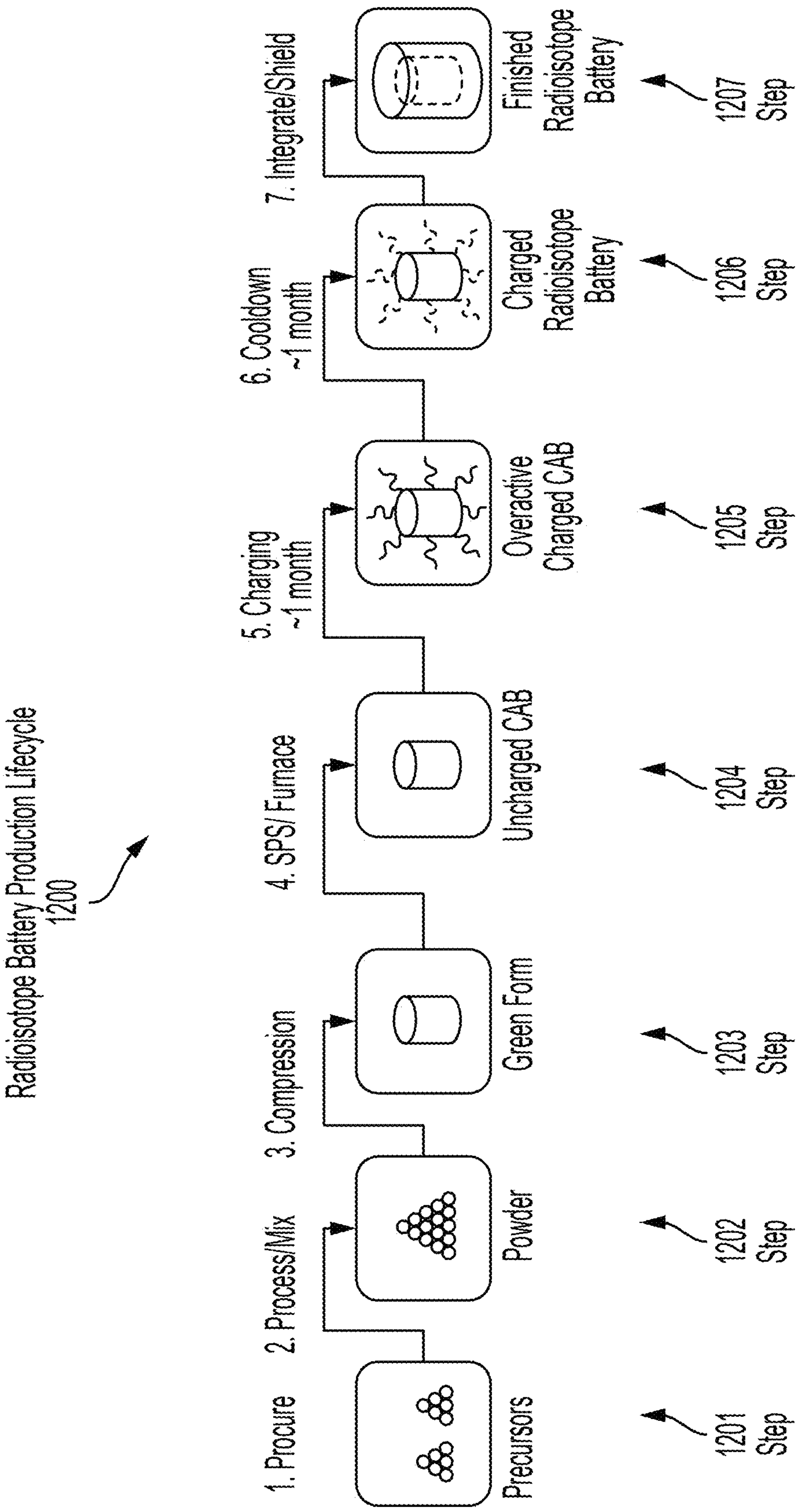
FIG. 12 is a flowchart of a radioisotope battery production lifecycle.

FIG. 12 is a flowchart of a radioisotope battery production lifecycle 1200. In step 1201, precursor material 859 is procured for the radioisotope battery 220. In step 1202, the precursor material 859 is processed into powder and mixed with powdered encapsulation material 1152. In step 1203, the powder mixture is bonded and compressed into a green form. In step 1204, the green form is sintered into an uncharged radioisotope battery 220. In step 1205, the uncharged radioisotope battery 220 is bombarded with neutrons for an extended period of time, in this example one month, placing the radioisotope battery 220 in an overactive charged state. In step 1206, the overactive charged radioisotope battery 220 is cooled down in a well-moderated space, allowing the overactive charged radioisotope battery 220 to release errant neutrons and become a charged radioisotope battery 220. In step 1207, the charged radioisotope battery 220 is finished by being encapsulated and shielded to protect and maintain fissile efficiency of the radioisotope battery 220.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A radioisotope power system, comprising:

a radioisotope power unit that emits a plurality of radiation particles;

a radiation shield configured to block a first radiation particle of the plurality of radiation particles; and a decoupling device configured to decouple the radiation shield from a vehicle.

2. The radioisotope power system of claim 1, wherein:

the radioisotope power unit includes one or more radioisotopes for power, propulsion, or both power and propulsion of the vehicle.

3. The radioisotope power system of claim 2, wherein the one or more radioisotopes include an alpha emitting isotope, a beta emitting isotope, a gamma emitting isotope, or a combination thereof.

4. The radioisotope power system of claim 2, wherein the one or more radioisotopes are for heat generation.

5. The radioisotope power system of claim 1, wherein the vehicle is a spacecraft.

6. The radioisotope power system of claim 1, wherein the vehicle is an aircraft.

7. The radioisotope power system of claim 1, wherein the decoupling device is further configured to decouple an aeroshell.

8. The radioisotope power system of claim 1, further comprising a shadow shield configured to block a second radiation particle of the plurality of radiation particles.

9. The radioisotope power system of claim 8, further wherein the decoupling device is configured to maintain coupling of the shadow shield to electronics during a mission.

10. The radioisotope power system of claim 9, wherein the electronics are configured to control the vehicle.

11. The radioisotope power system of claim 9, wherein the maintained coupling of the shadow shield to the electronics during the mission is configured to prevent some or all of the radiation particles from reaching the electronics.

12. The radioisotope power system of claim 8, wherein the radiation shield is configured to block the first radiation particle that travels around or is not blocked by the shadow shield.

13. The radioisotope power system of claim 8, wherein the shadow shield is configured to block the second radiation particle that is on a trajectory to intersect with electronics, payload, power modulation, other sensitive components, or a combination thereof.

14. The radioisotope power system of claim 1, wherein the radiation shield comprises depleted uranium, natural uranium, lead, tungsten alloy, or a combination thereof.

15. The radioisotope power system of claim 1, wherein the radiation shield comprises a non-trace quantity of an element identified in a periodic table as a sixth period or greater element.

16. The radioisotope power system of claim 1, wherein the radiation shield comprises a plurality of sub-shields.

17. The radioisotope power system of claim 16, wherein the plurality of sub-shields are separated upon decoupling by one or more pyrotechnic or mechanical fasteners or actuators, or frangible nut and tension stud devices.

18. The radioisotope power system of claim 1, wherein the decoupling device is further configured to decouple the radiation shield when the vehicle is in outer space.

19. The radioisotope power system of claim 1, wherein the decoupling device is further configured to decouple the radiation shield when the vehicle is in an orbit of an astronomical object or an astronomical body.

20. The radioisotope power system of claim 1, wherein the radiation shield is configured to reduce an amount of radiation penetrating the radiation shield measured at a distance of 30 centimeters (cm) away from the radiation shield to less than or equal to approximately 100 mrem per hour (mrem/hr).

* * * * *